United States Patent
Stanwood et al.

(10) Patent No.: US 7,656,825 B2
(45) Date of Patent: Feb. 2, 2010

(54) SYSTEM AND METHOD FOR WIRELESS COMMUNICATION IN A FREQUENCY DIVISION DUPLEXING REGION

(76) Inventors: Kenneth L. Stanwood, 2406 Montgomery Ave., San Diego, CA (US) 92007; Israel Jay Klein, 5260 Fiore Ter., Apt. 214, San Diego, CA (US) 92122

(*) Notice: Subject to any disclaimer, the term of this patent is extended or adjusted under 35 U.S.C. 154(b) by 155 days.

(21) Appl. No.: 11/969,178

(22) Filed: Jan. 3, 2008

(65) Prior Publication Data

US 2008/0144545 A1 Jun. 19, 2008

Related U.S. Application Data

(62) Division of application No. 09/947,644, filed on Sep. 5, 2001, now Pat. No. 7,339,926.

(60) Provisional application No. 60/233,757, filed on Sep. 14, 2000.

(51) Int. Cl.
*H04L 5/14* (2006.01)
*H04J 1/00* (2006.01)
*H04L 5/16* (2006.01)
*H04Q 7/00* (2006.01)

(52) U.S. Cl. .................. 370/275; 370/281; 370/296; 370/334

(58) Field of Classification Search .................. 370/275, 370/281, 296, 334
See application file for complete search history.

(56) References Cited

U.S. PATENT DOCUMENTS 3,949,404 A 4/1976 Fletcher et al.
4,495,619 A 1/1985 Acampora
5,130,983 A 7/1992 Heffner, III (Continued)

FOREIGN PATENT DOCUMENTS

EP 0 507 384 A2 10/1992

(Continued)

OTHER PUBLICATIONS

Lin., et al., "Error Control coding, Fundamentals and Applications", Prentice-Hall computer Applications in Electrical Engineering Series., 1993, pp. 315-349.

(Continued)

*Primary Examiner*—Andrew Lee
(74) *Attorney, Agent, or Firm*—Schwabe, Williamson & Wyatt, P.C.

(57) ABSTRACT

A method and system for using half-duplex base stations and half-duplex nodes in a Frequency Division Duplexing region to provide wireless connectivity between the half-duplex base stations and customers in multiple sectors of a cell. The method and system can use two physical channels to form two logical channels. Each logical channel shares both physical channels during alternating frames of time. The half-duplex nodes can include a millimeter-wave band frequency synthesizer configured to transmit and receive on different channels to and from the half-duplex base station. Re-use patterns of the physical channels are used for deployment of half-duplex base stations and half-duplex nodes in the FDD region to minimize co-channel interference and interference due to uncorrelated rain fade. Additional methods and systems utilize full-duplex base stations and smart antenna to communicate with the half-duplex nodes.

29 Claims, 16 Drawing Sheets

U.S. PATENT DOCUMENTS

| | | | |
|---|---|---|---|
| 5,297,144 A | 3/1994 | Gilbert et al. | |
| 5,420,851 A | 5/1995 | Seshadri et al. | |
| 5,444,698 A | 8/1995 | Kito | |
| 5,499,243 A | 3/1996 | Hall | |
| 5,511,082 A | 4/1996 | How et al. | |
| 5,517,503 A | 5/1996 | Hess | |
| 5,568,511 A | 10/1996 | Lampe | |
| 5,615,212 A | 3/1997 | Ruszczyk et al. | |
| 5,617,412 A * | 4/1997 | Delprat et al. | 370/281 |
| 5,638,371 A | 6/1997 | Raychaudhuri et al. | |
| 5,638,374 A | 6/1997 | Heath | |
| 5,663,957 A | 9/1997 | Dent | |
| 5,675,573 A | 10/1997 | Karol et al. | |
| 5,712,860 A | 1/1998 | Hardin | |
| 5,745,532 A | 4/1998 | Campana | |
| 5,751,708 A | 5/1998 | Eng et al. | |
| 5,754,536 A * | 5/1998 | Schmidt | 370/330 |
| 5,757,787 A * | 5/1998 | Dent | 370/330 |
| 5,761,622 A | 6/1998 | Priest | |
| 5,768,254 A | 6/1998 | Papadopoulos et al. | |
| 5,828,695 A | 10/1998 | Webb | |
| 5,859,619 A | 1/1999 | Wu et al. | |
| 5,890,055 A | 3/1999 | Chu et al. | |
| 6,006,069 A | 12/1999 | Langston | |
| 6,016,311 A | 1/2000 | Gilbert et al. | |
| 6,016,313 A | 1/2000 | Foster, Jr. et al. | |
| 6,026,114 A | 2/2000 | Koh | |
| 6,038,455 A | 3/2000 | Gardner et al. | |
| 6,094,421 A | 7/2000 | Scott | |
| 6,112,080 A | 8/2000 | Anderson et al. | |
| 6,300,880 B1 | 10/2001 | Sitnik | |
| 6,549,761 B1 | 4/2003 | Kim | |
| 6,570,858 B1 | 5/2003 | Emmons et al. | |
| 6,611,537 B1 | 8/2003 | Edens et al. | |
| 6,748,218 B1 * | 6/2004 | Johnson et al. | 455/446 |
| 6,839,333 B1 | 1/2005 | Akerberg | |
| 6,975,582 B1 | 12/2005 | Karabinis et al. | |
| 7,006,477 B1 | 2/2006 | Balachandran et al. | |
| 7,010,286 B2 | 3/2006 | Sorrells et al. | |
| 7,054,289 B1 | 5/2006 | Foster et al. | |
| 7,085,560 B2 | 8/2006 | Petermann | |

2002/0137517 A1    9/2002  Williams et al.

FOREIGN PATENT DOCUMENTS

| | | |
|---|---|---|
| EP | 0 720 405 A2 | 7/1996 |
| EP | 0 891 060 A2 | 1/1998 |
| EP | 0 845 916 A2 | 6/1998 |
| WO | WO 92/22162 A1 | 12/1992 |
| WO | WO 98/59441 A2 | 11/1998 |
| WO | WO 99/38343 A2 | 7/1999 |
| WO | WO 99/39532 A1 | 8/1999 |
| WO | WO 00/01188 A1 | 1/2000 |
| WO | WO 01/76106 A2 | 10/2001 |

OTHER PUBLICATIONS

L.H. Charles Lee, "Convolutional Coding, Fundamentals and Applications", Artech House, Inc. 1997, p. 11-51.

Redl, et al., "An Introduction to GSM", Artech House, Inc., 1995; pp. 84, 85 and 95.

C.E. Shannon, "A Mathematical Theory of Communication", Bell System Technical Journal, vol. 27; pp. 379-423 (Part 1), 623-656 (Part 11), Oct. 1948.

Ulm., et al., "Data-Over-Cable Interface Spec., Radio Frequency Interface Spec.", H.P. Interim Spec., Doc. Control No. SP-RFII01-970321, Pub Mar. 21, 1997 by MCNS Holdings, L.P., Sec. 6, pp. 48-85.

Wolf, et al. "On the Weight Distribution of Linear Block Codes Formed From Convolutional Codes", IEEE, IEEE Transactions on Communications vol. 44:9, Sep. 1996.

"Asynchronous Transfer Mode (ATM) Technical Overview", 2nd Edition, Prentice Hall, Oct. 1995, Chapter 3, pp. 21-25.

Sampei, S. at al., Adaptive Modulation/TDMA Scheme for Personal Multi-Media Communication Systems, (Nov. 28, 1994) Telecommunications Conference (Globecom), IEEE, pp. 989-993.

Ue, Toyoki et al., Symbol Rate and Modulation Level Controlled Adaptive Modulation/TDMA/TDD for Personal comm. Systems, Jul. 25, 1995 Proceedings of the Vehicular Technology Conf. IEEE, Vol. Conf. 45, pp. 306-310.

Office Action for U.S. Appl. No. 11/969,161, mailed Aug. 27, 2009.
Office Action for U.S. Appl. No. 11/969,770, mailed Aug. 25, 2009.
Office Action for U.S. Appl. No. 11/969,787, mailed Aug. 24, 2009.

* cited by examiner

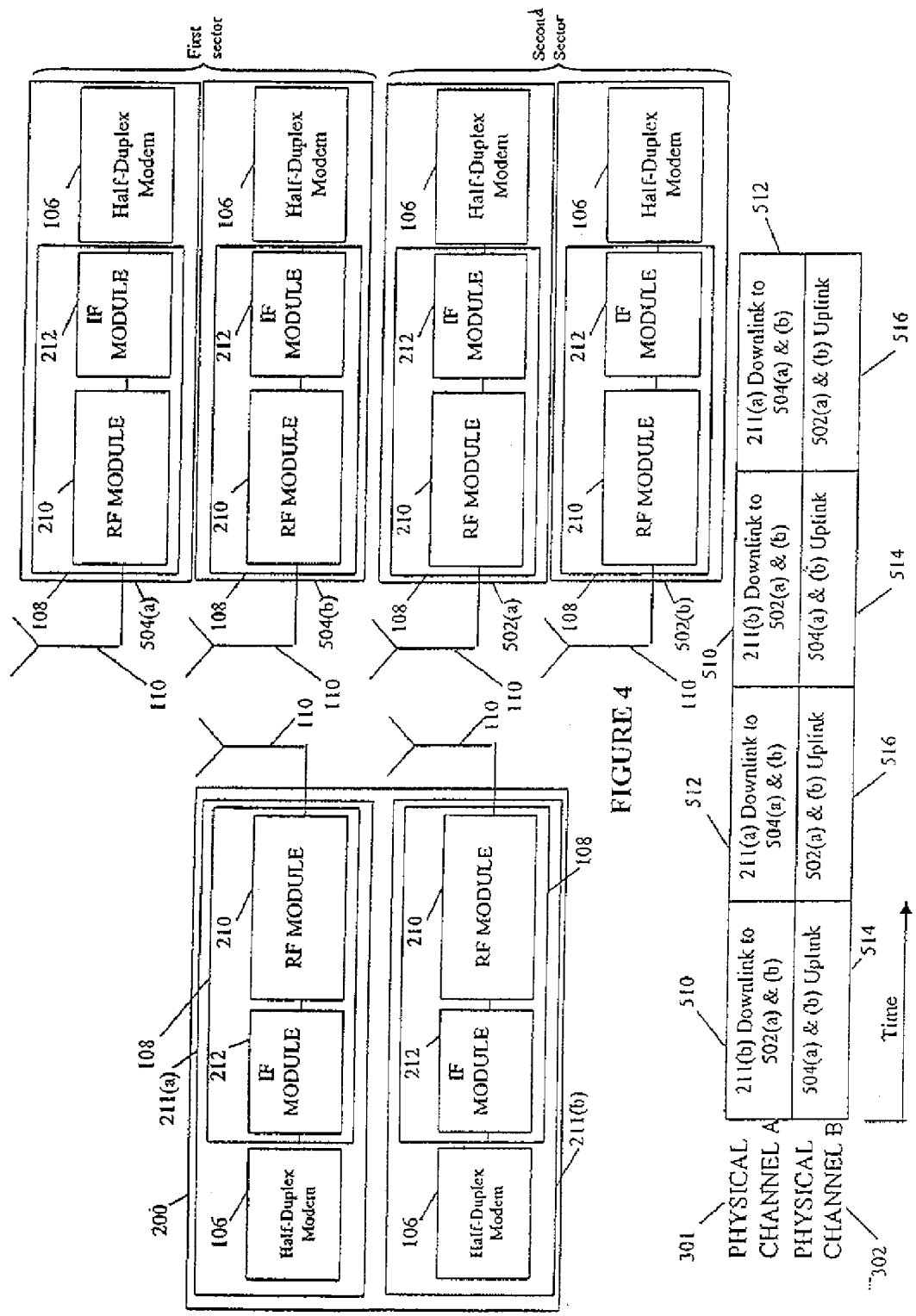

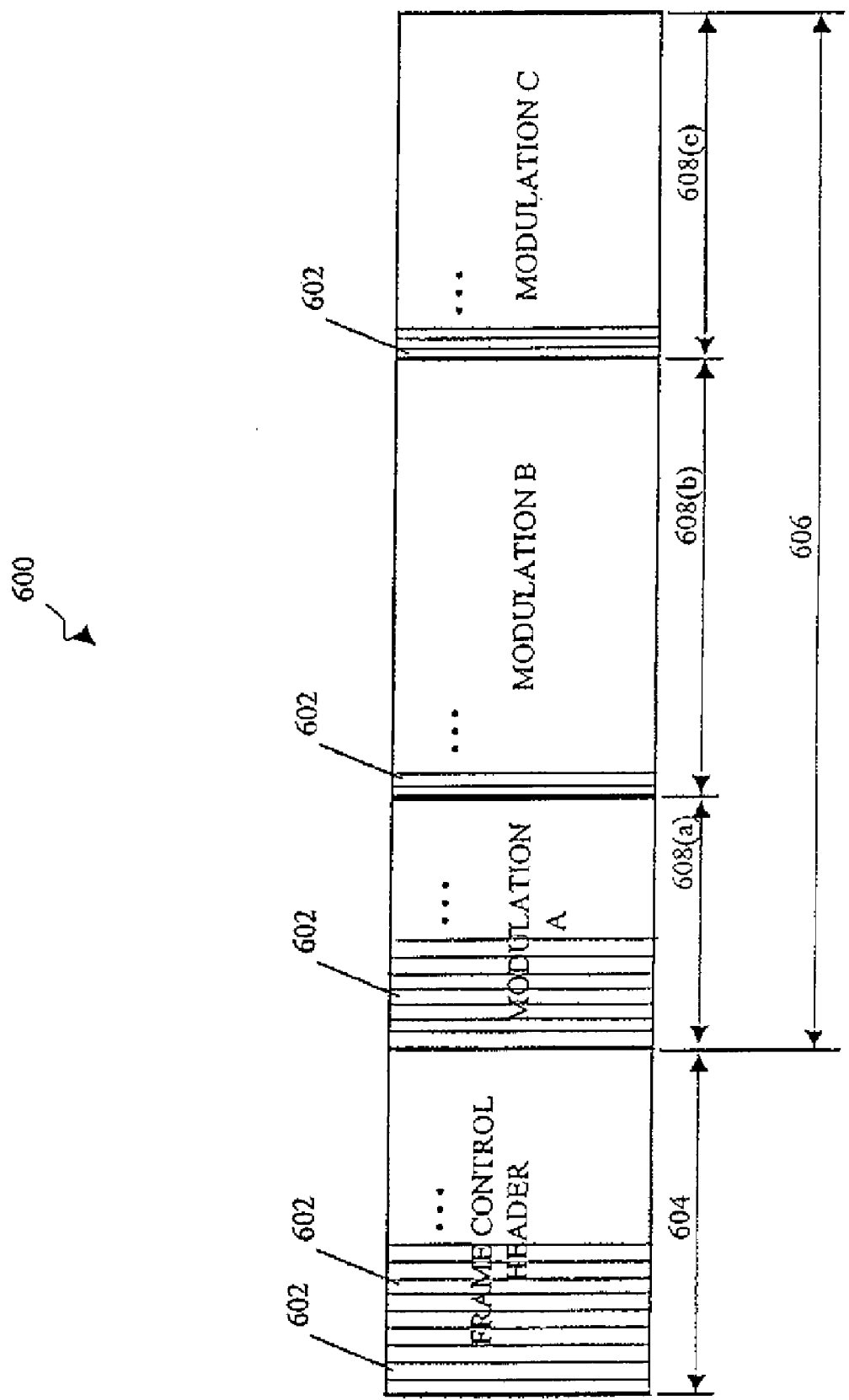

SYSTEM AND METHOD FOR WIRELESS COMMUNICATION IN A FREQUENCY DIVISION DUPLEXING REGION

RELATED APPLICATIONS

This application is a divisional application of non-provisional application Ser. No. 09/947,644, filed Sep. 5, 2001 titled "SYSTEM AND METHOD FOR WIRELESS COMMUNICATION IN A FREQUENCY DIVISION DUPLEXING REGION" which claims the benefit to provisional application Ser. No. 60/233,757, filed Sep. 14, 2000, titled "FIBERLESS-DEVELOPING A SHORT TERM FREQUENCY DIVISION DUPLEX SOLUTION". Application Ser. Nos. 09/947,644 and 60/233,757 are hereby incorporation by reference.

BACKGROUND OF THE INVENTION

1. Field of the Invention

This invention relates to wireless communication systems and to a method and system for using such a system in a Frequency Division Duplexing region.

2. Description of Related Art

A wireless communication system facilitates two-way communication between a plurality of subscriber units (fixed and portable) and a fixed network infrastructure. Exemplary communication systems include mobile cellular telephone systems, personal communication systems (PCS), and cordless telephones. The key objective of these wireless communication systems is to provide communication channels on demand between the plurality of consumer subscriber units and their respective base stations in order to connect the subscriber unit user with the fixed network infrastructure.

Subscriber units typically communicate trough a node with the base station using a "duplexing" scheme thus allowing the exchange of information in both directions of connection. Transmissions from the base station to the nodes are commonly referred to as "downlink" transmissions. Transmissions from the nodes to the base station are commonly referred to as "uplink" transmissions. In wireless systems having multiple access schemes a time "frame" is used as the basic information transmission unit.

Depending upon the design criteria of a given system, systems have typically used either time division duplexing (TDD) or frequency division duplexing (FDD) methods to facilitate the exchange of information between the base station and the nodes. In a TDD communication system, the base station and the nodes use the same channel, however, their downlink and uplink transmissions alternate one after the other to prevent interference. In a FDD communication system, the base station and the nodes use different channels for their downlink and uplink transmissions, respectively. Thus, the concern for interference between uplink and downlink transmissions is mitigated in a FDD communication system as compared to a system using TDD. However, the increased cost and complexity in deploying a FDD communication system often outweighs this obvious advantage over a TDD communication system.

In both TDD and FDD systems, each base station and node includes a modem connected to an outdoor unit ("ODU"). The modem is configured to modulate an outgoing signal and demodulate an incoming signal. If the modem is configured to modulate and demodulate simultaneously, the modem is a "full-duplex" modem. If the modem is not configured to modulate and demodulate simultaneously, but rather switches between modulating and demodulating, the modem is a "half-duplex" modem. Similarly, the ODU can be configured as a full-duplex or half-duplex ODU. A full-duplex ODU is configured to transmit an outgoing signal and receive an incoming signal at the same time. A half-duplex ODU would alternate between transmitting and receiving.

In an exemplary FDD communication system, the modem and ODU operate simultaneously to transmit and receive information. Since this occurs simultaneously, any subcomponents that might be common to the transmit and receive signal paths through the modem and ODU are not shared. In contrast, since the modem and ODU in an exemplary TDD communication system are half-duplex, components which may be common to the transmit and receive paths can be shared. Such sharing reduces the cost of the system.

As opposed to allowing each region to select an FDD or TDD communication protocol based on such advantages and disadvantages, certain specific regions are restricted by communication regulations. These communication regulations often mandate the use of different channels, i.e. frequency bands, for uplink and downlink communications similar to an FDD communication system. For example, in Germany, a 26 GHz band is FDD oriented since the uplink channel and downlink channel are clearly defined. In a typical case, a service provider is granted 2 or 4 channel pairs (2×28 MHz each) and is required to maintain a channel separation between the uplink and downlink channels.

By requiring a service provider to use different uplink and downlink channels, there is little incentive to use half-duplex modems or ODUs. If an exemplary half-duplex modem or ODU were used, a significant loss in bandwidth would be incurred.

Consequently, there is a need for a system and method that allows the use of half-duplex modems and half-duplex ODUs in an FDD communication system. Furthermore, this system and method should simplify the re-use of available channels and limit co-channel interference between multiple base stations or multiple nodes in such a region.

SUMMARY OF THE INVENTION

The systems and methods of the present invention have several features, no single one of which is solely responsible for its desirable attributes. Without limiting the scope of this invention as expressed by the claims which follow, its more prominent features will now be discussed briefly.

One aspect of the invention relates to a method for communicating between half-duplex nodes and a base station, where each half-duplex node is configured to transmit on an uplink channel and receive on a downlink channel in a frequency division duplexing ("FDD") manner. The method comprises transmitting modulated data from a base station to a first half-duplex node during a first time frame on a first channel and transmitting modulated data from a second half-duplex node to the base station during the first time frame on a second channel. The method further comprises transmitting modulated data from the base station to the second half-duplex node during a second time frame on the first channel, wherein the first time frame precedes the second time frame, and transmitting modulated data from the first half-duplex node to the base station during the second time frame on the second channel.

In another aspect of the invention, a wireless communication system is configured to transmit and receive over channels between half-duplex nodes and a base station in a frequency division duplexing ("FDD") manner. The system comprises a first node comprising a first modem and a first outdoor unit coupled to the first modem and configured to alternate between transmitting modulated data over a first channel and receiving modulated data over a second channel and a second node comprising a second modem and a second outdoor unit coupled to the second modem and configured to alternate in transmitting modulated data over the first channel and receiving modulated data over the second channel. The system further comprises a base station comprising a first half duplex base station modem configured to modulate and demodulate data transmitted to and received from the first outdoor unit and a first half-duplex base station outdoor unit coupled to the first half-duplex base station modem and configured to transmit modulated data to the first outdoor unit over the second channel and receive modulated data from the first outdoor unit over the first channel. The system further comprises a second half-duplex base station modem configured to modulate and demodulate data transmitted to and received from the second outdoor unit and a second half-duplex base station outdoor unit coupled to the second half-duplex base station modem and configured to transmit modulated data to the second outdoor unit over the second channel and receive modulated data from the second outdoor unit over the first channel.

BRIEF DESCRIPTION OF THE DRAWINGS

FIG. 1b is a block diagram of a frame structure that includes two physical channels for use with the communication system of FIG. 1a.

FIG. 4 is a block diagram of nodes in a first sector and nodes in a second sector communicating with a base station in an FDD communication region.

FIG. 5 is a block diagram of a frame structure that includes two physical channels for use with the communication system of FIG. 4.

FIG. 6 illustrates an example of a downlink subframe for use by the base station in transmitting information to the nodes in the first sector and to the nodes in the second sector on the downlink channel A of FIG. 5.

The features, objectives, and other advantages will become more apparent from the detailed description set forth below when taken in conjunction with the drawings wherein like parts are identified with like reference numerals throughout.

DETAILED DESCRIPTION OF THE PRFFERRFD EMBODIMENT

Throughout this description, the embodiments and examples shown should be considered as exemplars, rather than as limitations on the present invention.

Figure 1A:
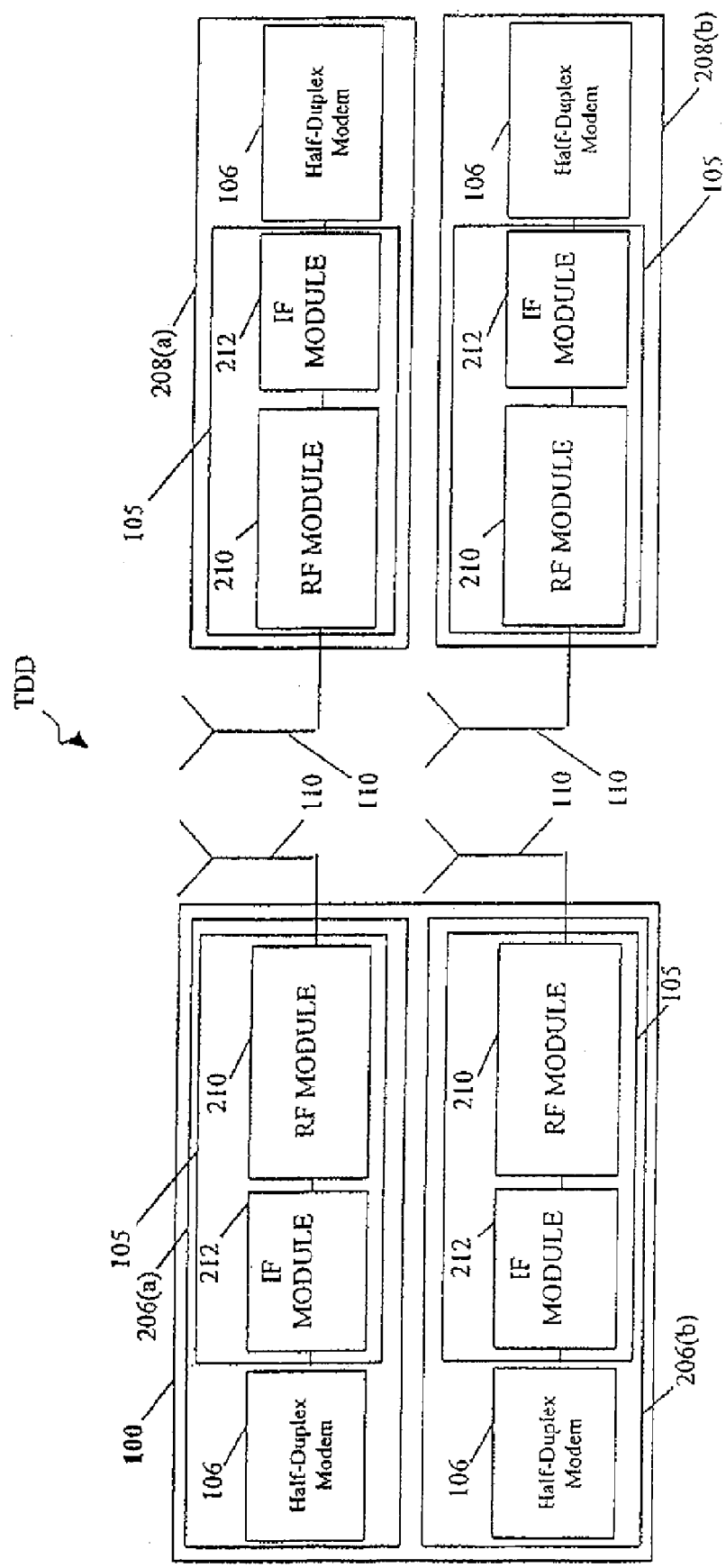
FIG. 1a is a block diagram of a base station communicating with a first node and a second node in a Time Division Duplex (TDD) manner.

FIG. 1a is a block diagram of a base station 100 communicating with a first node 208(a) and a second node 208(b) in a Time Division Duplex manner. The system provides wireless connectivity between the base station 100 and the first and second nodes 208(a), 208(b). The first and second nodes are positioned at fixed customer sites in a coverage area. The coverage area is served by base station 100. The coverage area can be in the shape of, for example, a square containing multiple sectors. Node 208(a) and node 208(b) can be located in different sectors while communicating with base station 100. The base station may service several hundred or more residential and business nodes (not shown). Users may include both residential and business customers.

Each node 208(a), 208(b) can include a half-duplex modem 106, a half-duplex outdoor unit ("ODU") 105, and an antenna 110, for example, a directional antenna. The modem 106 is configured to modulate an outgoing signal and demodulate an incoming signal. The ODU 105 is configured to upconvert the outgoing signal received from the modem 106 and down convert the incoming signal received from the antenna 110. Each node receives its incoming signal and transmits its outgoing signal on the same band of frequencies.

The upconversion and down conversion of the incoming and outgoing signals can be performed in a plurality of stages. Each stage within the ODU 105 shifts the signal from a higher to a lower frequency or from a lower to a higher frequency. For example, the ODU in FIG. 1a performs each upconversion and down conversion in two stages. To this end, the ODU 105 includes a radio frequency ("RF") module 210 and an intermediate frequency ("IF") module 212. The RF module 210 steps the incoming signal down to an intermediate frequency at which point the IF module further steps the signal down to a base band signal. The base band signal is then processed by the modem 106. For, an outgoing signal that has been modulated by the modem 106, the IF module 212 steps the signal up from the base band frequency to an intermediate frequency. The IF module 212 then steps up the outgoing signal to the radio frequency prior to the transmission of the signal by the antenna 110. Alternatively, the up conversion and down conversion can be performed in a single stage or in more than two stages.

The term "module," as used herein, means, but is not limited to, a software or hardware component, such as a FPGA or ASIC, which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

The base station 100 shown in FIG. 1a includes two half-duplex modems 106, two half-duplex ODU 105, and two antennas 110. The base station 100 is configured to communicate with nodes in multiple sectors. Base station components 206(a) communicate with node 208(a). While, base station components 206(b) communicate with node 208(b). Similarly, node 208(a) communicates with base station components 206(a). Node 208(b) communicates with base station components 206(b). Thus, the base station 100 communicates with both nodes 208(a), 208(b). For ease of description, only one node is shown communicating with each base station modem in FIG. 1a. However, multiple nodes can be present in any given sector to form a point to multi-point communication system with the base station. With multiple nodes, the antenna 110 in FIG. 1a transmits and receives between the nodes in one sector of a coverage area. A different antenna 110 may transmit and receive between the nodes in another sector of a coverage area or in the same sector but another physical channel. The base station modems 106, ODUs 105, and antenna 110 operate as described with reference to nodes 208(a), 208(b).

Figure 1B:
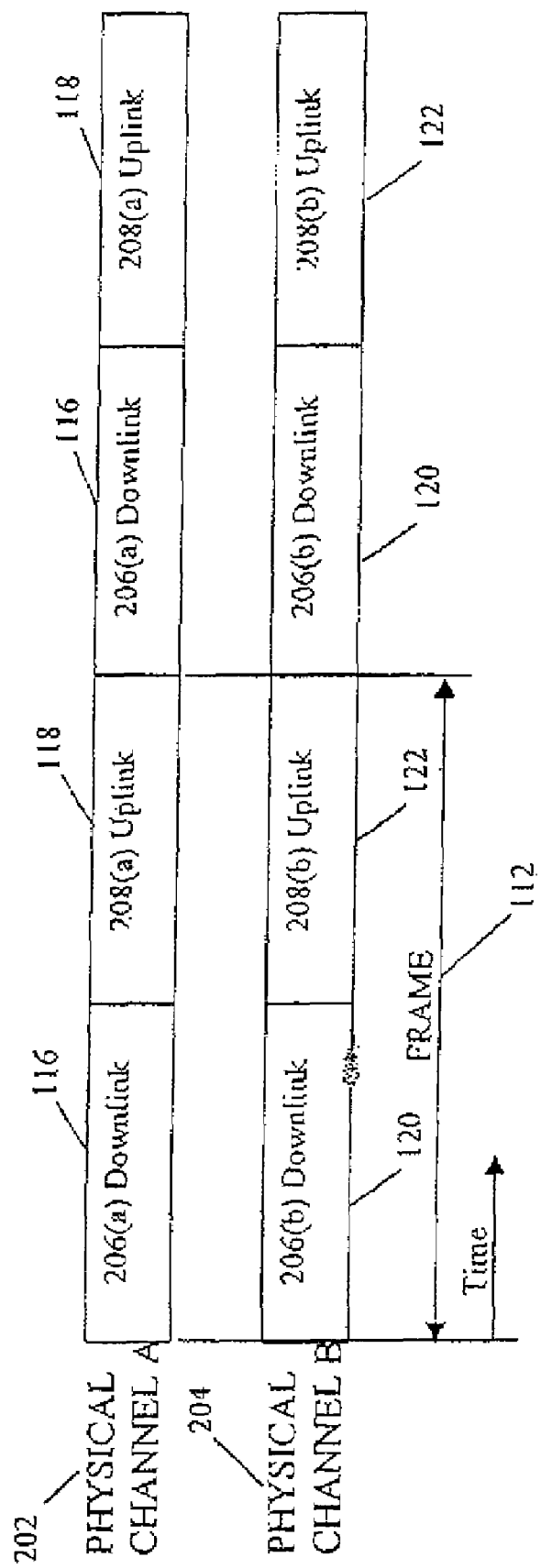

FIG. 1b is a block diagram of a frame structure that includes two physical channels. The frame structure can be used with the communication system of FIG. 1a. FIG. 1b represents a discrete time segment. Physical channel A 202 is allocated for downlinks and uplinks between the base station components 206(a) and the node 208(a) (See FIG. 1a). Physical channel B 204 is allocated for downlinks and uplinks between the base station components 206(b) and the node 208(b) (See FIG. 1a). Since physical channel A 202 includes the uplinks and downlinks between node 208(a) and base station components 206(a), physical channel A forms a logical channel between node 208(a) and base station components 206(a). Since physical channel B 204 includes the uplinks and downlinks between node 208(b) and base station components 206b), physical channel B forms a logical channel between node 208(b) and base station components 206(b).

The base station components 206(a) downlink to node 208(a) during a subframe 116 of physical channel A 202. The node 208(a) uplinks to the base station components 206(a) during subframe 118 of physical channel A 202. Subframe 116 and subframe 118 together form a frame 112. The base station components 206(b) downlink to node 208(b) during a subframe 120 of physical channel B 204. The node 208(b) uplinks to the base station components 206(b) during subframe 122 of physical channel B 204. Subframe 120 and subframe 122 together also form a frame 112.

Figure 1C:
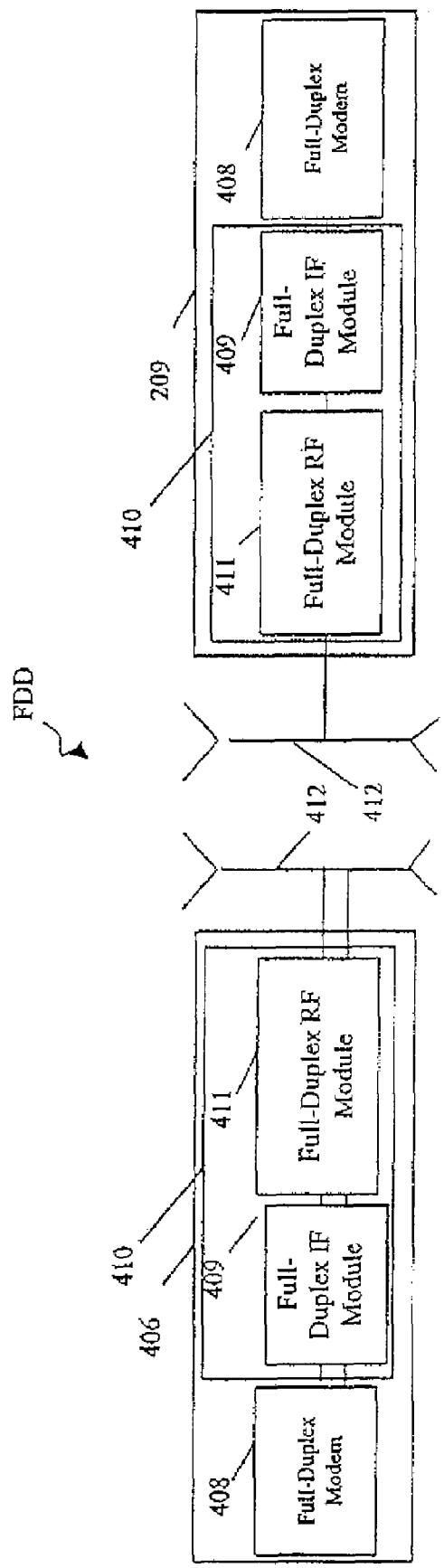
FIG. 1c is a block diagram of a base station communicating with a node in a Frequency Division Duplex (FDD) manner.

FIG. 1c is a block diagram of a base station 406 communicating with a node 209 in a Frequency Division Duplex (FDD) manner. The base station 406 includes a frill-duplex modem 408, a full-duplex ODU 410, and a full-duplex antenna 412. The base station 406 is configured to transmit an outgoing signal and receive an incoming signal simultaneously on different channels. The full-duplex modem 408 is configured to modulate and demodulate an incoming signal and to demodulate an outgoing signal simultaneously. The full-duplex ODU down converts the incoming signal from a radio frequency in stages to a base band frequency. The frill-duplex ODU also upconverts a modulated base band signal in stages prior to transmission of the outgoing signal at the radio frequency. Alternatively, the tip conversion and down conversion can occur in one stage or more than two stages.

The full-duplex ODU 410 can include a full-duplex intermediate frequency ("IF") module 409 and a full-duplex radio frequency ("RF") module 411. The full-duplex IF module 409 is configured to simultaneously upconvert an outgoing signal and down convert an incoming signal on different channels. The full-duplex RF module 411 is configured to simultaneously upconvert the outgoing signal from the IF module and down convert an incoming signal from the antenna 412. The antenna 412 is configured to simultaneously transmit to and receive from a node 209. For ease of description, only one node is shown in FIG. 1c. However, multiple nodes can be present in any given sector to form a point to multi-point communication system with the base station. With multiple nodes, the antenna 412 in FIG. 1c transmits and receives between the nodes in one sector of a coverage area.

The node 209 shown in FIG. 1c includes a full-duplex modem 408, a full-duplex ODU 410, and an antenna 412. The node communicates with base station 406. The modem 408, ODU 410, and antenna 412 operate as described with reference to base station 406.

Figure 1D:
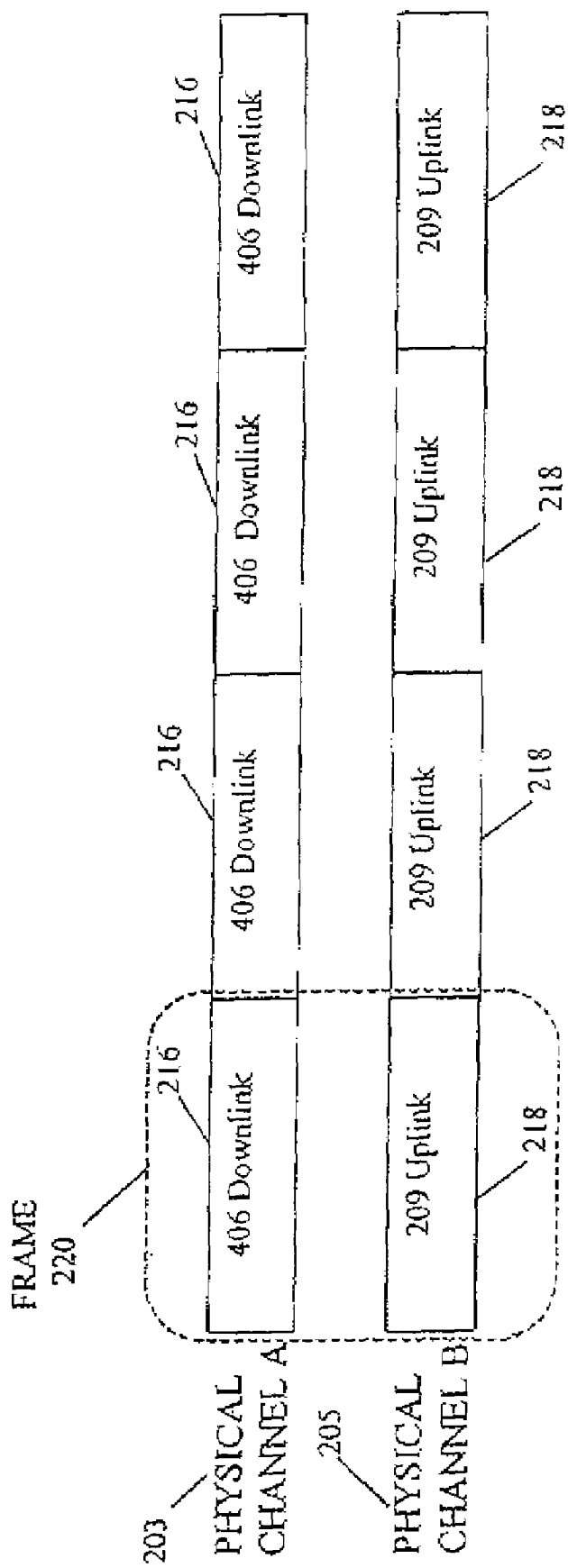
FIG. 1d is a block diagram of a frame structure that includes two physical channels for use with the communication system of FIG. 1c.

FIG. 1d is a block diagram of a frame structure that includes two physical channels. The frame structure can be used with the communication system of FIG. 1c. FIG. 1d represents a discrete time segment. Physical channel A 203 is allocated for downlinks from the base station 406 to the node 209 (See FIG. 1c). Physical channel B 205 is allocated for uplinks from node 209 to the base station 406 (See FIG. 1c). Since physical channel A 203 and physical channel B 205 together include the uplinks and downlinks between node 209 and base station 406, both channels together form a single logical channel between node 209 and base station 406.

The base station 406 downlinks to node 209 during a subframe 216 of physical channel A 203. The node 209 uplinks to the base station 406 during subframe 218 of physical channel B 205. Subframe 216 and subframe 218 together form a frame 220.

Figure 1E:
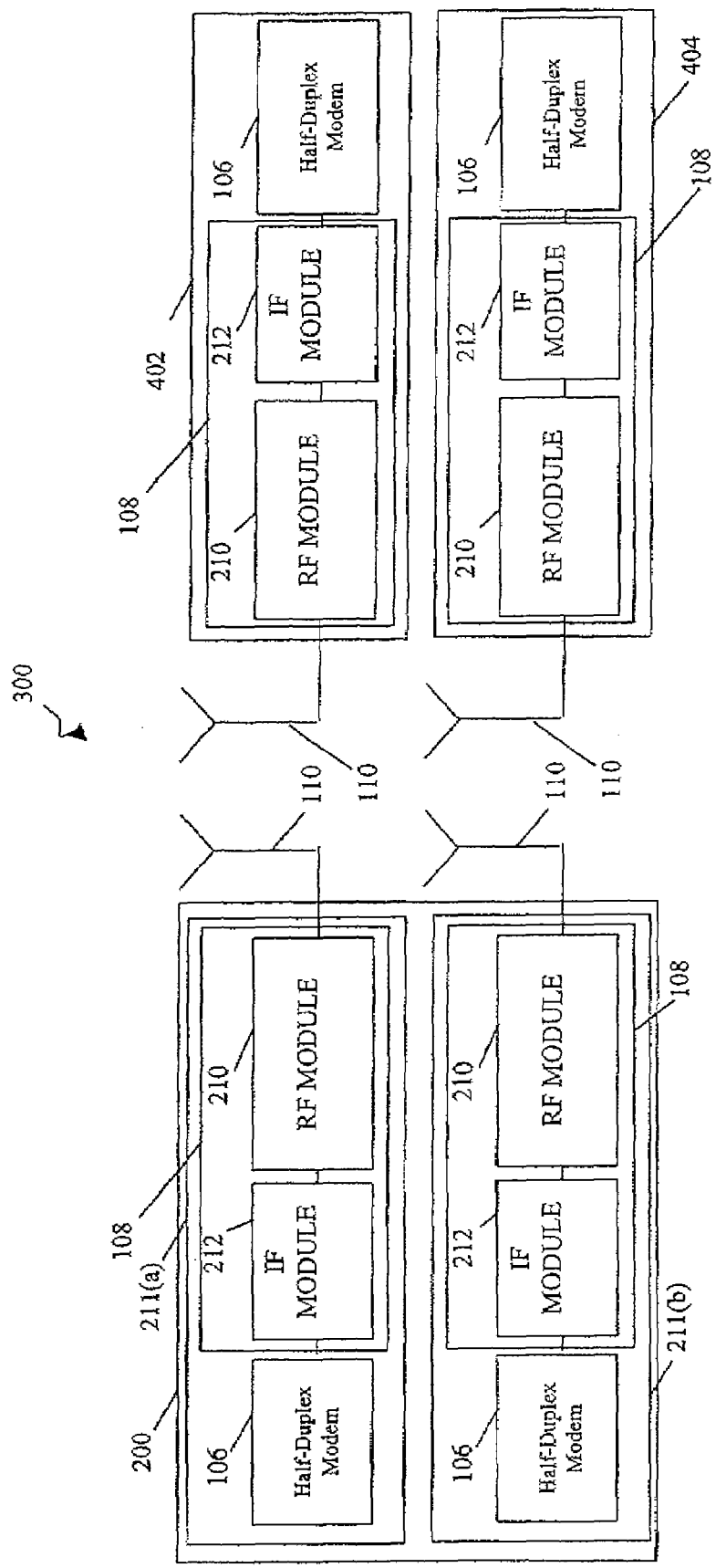
FIG. 1e is a block diagram of a base station communicating with a first node and a second node in an FDD communication region.

FIG. 1e is a block diagram of a base station 200 communicating with a first node 402 and a second node 404 in an FDD communication region. The system 300 provides wireless connectivity between the base station 200 and the first and second nodes 402, 404. The first and second nodes 402, 404 are positioned at fixed customer sites in a coverage area. The coverage area is served by base station 200. The coverage area can be in the shape of for example, a square containing multiple sectors. Node 402 and node 404 can be located in different sectors while communicating with base station 200. The base station may service several hundred or more residential and business nodes (not shown). Users may include both residential and business customers.

Each node 402, 404 can include a half-duplex modem 106, a half-duplex outdoor unit ("ODU") 108, and an antenna 110, for example a directional antenna. The modem 106 is configured to modulate an outgoing signal and demodulate an incoming signal. The ODU 108 is configured to upconvert the outgoing signal received from the modem 106 and down converts the incoming signal received from the antenna 110. The ODU is further configured to shift the frequency of either the incoming or outgoing signal to a different frequency. By shifting one of the signals, the node transmits at a frequency that is different than the frequency at which the node receives an incoming signal.

The upconversion and down conversion of the incoming and outgoing signals can be performed in a plurality of stages. Each stage within the ODU 108 shifts the signal from a higher to a lower frequency or from a lower to a higher frequency. For example, the ODU in FIG. 1e performs each upconversion and down conversion in two stages. To this end, the ODU 108 includes a radio frequency ("RF") module 210 and an intermediate frequency ("IF") module 212. The RFV module 210 steps the incoming signal down to an intermediate frequency at which point the IF module further steps the signal down to a base band signal. The base band signal is then processed by the modem 106. For an outgoing signal that has been modulated by the modem 106, the IF module 212 steps the signal up from the base band frequency to an intermediate frequency. The IF module 212 then steps up the outgoing signal to the radio frequency prior to the transmission of the signal by the antenna 110. Alternatively, the up conversion and down conversion can be performed in a single stage or in more than two stages.

The base station 200 shown in FIG. 1e includes two half-duplex modems 106, two half-duplex ODU 108, and two antennas 110. The two half-duplex modems 106, the two half-duplex ODU 108, and the two antennas 110 operate as described with respect to nodes 402, 404.

The base station 200 is configured to communicate with nodes in multiple sectors. The base station components 211(a) communicate with node 402. Base station components 211(b) communicate with node 404. Similarly, node 402 communicates with base station components 211(a). Node 404 communicates with the base station components 211(b). Thus, the base station 200 communicates with both nodes 402, 404. For ease of description, only one node is shown communicating with each base station modem in FIG. 1e. However, multiple nodes can be present in any given sector to form a point to multi-point communication system with the base station. With multiple nodes, the antenna 110 in FIG. 1e transmits and receives between the nodes in one sector of a coverage area. A different antenna 110 may transmit and receive between the nodes in another sector of a coverage area or in the same sector but another physical channel.

The nodes 402, 404 are synchronized such that only one node transmits during any given period of time. The nodes 402, 404 utilizes a timing signal, for example a timing signal transmitted by the base station to the nodes 402, 404, to maintain synchronization. Alternatively, a GPS signal may be used. The base station is the only transmitter operating in the downlink direction; hence it transmits without having to synchronize with other base stations.

The systems shown herein can be implemented using the systems, including hardware and software, as are described, for example, in U.S. Pat. No. 6,016,311, issued Jan. 18, 2000, titled Adaptive Time Division Duplexing Method and Apparatus for Dynamic Bandwidth Allocation Within a Wireless Communication System; application Ser. No. 09/316,518, filed May 21, 1999, titled Method and Apparatus for Allocating Bandwidth in a Wireless Communication System; application Ser. No. 09/430,379, filed Oct. 22, 1999, titled Method and Apparatus for Data Transportation and Synchronization Between Mac and Physical Layers in a Wireless Communication System; application Ser. No. 09/365,917, filed Aug. 3, 1999, titled Frame Structure of an Adaptive Modulation Wireless Communication System; application Ser. No. 09/471,295, filed Dec. 24, 1999, titled Method and Apparatus for Concatenated Channel Coding in a Data Transmission System; application Ser. No. 09/564,377, filed May 1, 2000, titled Method and Apparatus for Concatenated Channel Coding with Variable Code Rate and Coding Gain in a Data Transmission System; and application Ser. No. 09/539,851, filed Mar. 31, 2000, titled Method and Apparatus for Reducing Co-Channel Interference in a Frame Synchronized Wireless Communication System the disclosures of which are hereby incorporated by reference. Such an implementation would require the addition of an offset to the millimeter-wave transceiver within the outdoor unit. The outdoor unit and the indoor unit sections would remain half-duplex as disclosed in the above incorporated patents and applications.

Figure 1F:
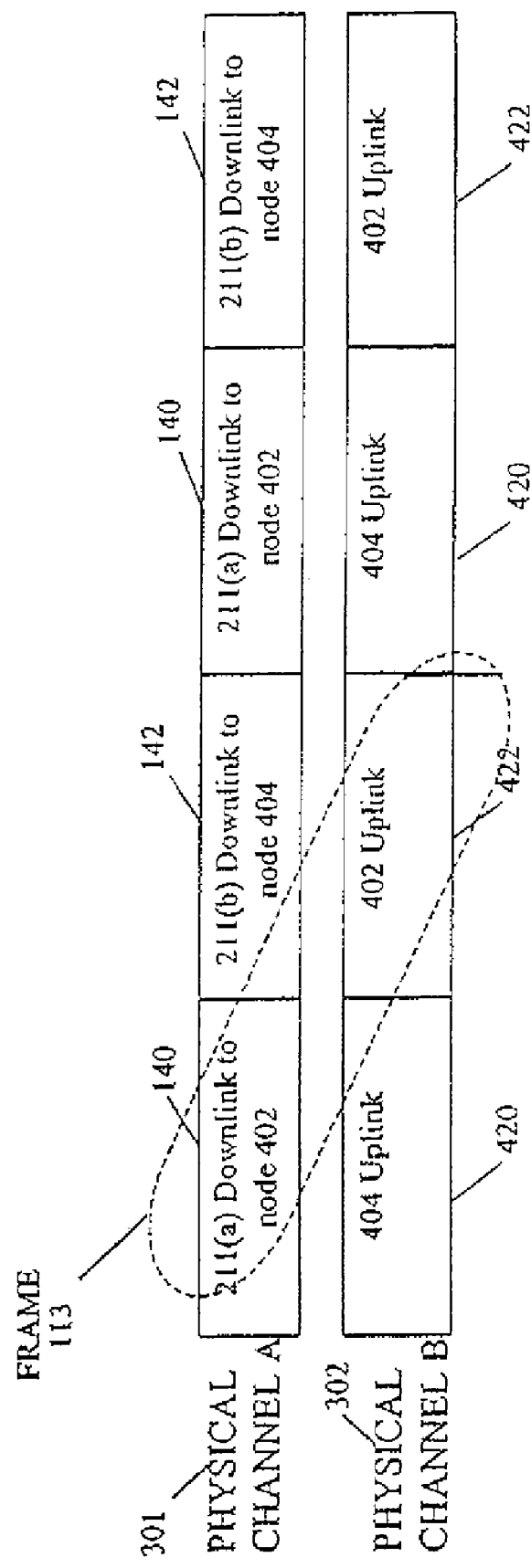
FIG. 1f is a block diagram of a frame structure that includes two physical channels for use with the communication system of FIG. 1e.

FIG. 1f is a block diagram of a frame structure that includes two physical channels. The frame structure can be used with the communication system of FIG. 1e. The Figure represents a discrete time segment. Physical channel A 301 is allocated for downlinks from the base station components 211(a), 211(b) to the first and second nodes 402, 404 (See FIG. 1e). The base station alternates its broadcast between a subframe 140 which includes information for node 402 and a subframe 142 which includes information for node 404.

Physical channel B 302 is allocated for subframes 420, 422 in an uplink direction from the first and second nodes 402, 404 to the base station 200. Node 404 transmit information to the base station components 211(b) (See FIG. 1e) during subframe 420. Node 402 transmit information to the base station components 211(a) (See FIG. 1e) during subframe 422. Node 402 and node 404 can alternate in their transmission of subframes 420, 422 on physical channel B 302. Thus, the base station 200 receives alternating subframes from the nodes 402, 404 on physical channel B 302. Alternatively, the assigning of subframes of physical channel B can be varied depending, for example, on the bandwidth requirements of the nodes. The term channel is used to mean a band or range of frequencies of sufficient width for communication, e.g., 26.500 GHz to 26.525 GHz (a 25 MHz wide channel).

Physical channel A 301 includes the downlinks from base station components 211(a) to node 402 while physical channel B 302 includes the uplinks from node 402 to base station components 211(a). Thus, subframes 140 and 422 from physical channels A and B, respectively, form a logical channel between node 402 and base station components 211(a). Similarly, physical channel A 301 includes the downlinks from base station components 211(b) to node 404 while physical channel B 302 includes the uplinks from node 404 to base station components 211(b). Thus, subframes 142 and 420 from physical channels A and B, respectively, also form a logical channel between node 404 and base station components 211(b). For example, the uplink and downlink subframes that form the logical channel between node 402(a) and the base station components 211(a) are illustrated by frame 113. In contrast to the FDD system illustrated in FIGS. 1c and 1d which uses two physical channels to produce a single logical channel, the system 300 illustrated in FIGS. 1e and 1f produces two logical channels with the same number of physical channels.

Referring to FIGS. 1e and 1f, each RF module 210 of each node is configured to allow its node to utilize both available physical channels 301, 302. For example, when node 404 transmits information to base station 200, its RF module 210 selects channel 302 for the information's transmission through its antenna 110. When node 404 is scheduled to receive information from the base station 200, its RF module 210 switches from channel 302 to channel 301. Thus, node 404 uses both channels 301, 302.

Both nodes 402, 404 and the base station 200 may perform the tasks ascribed to them using a combination of hardware, firmware and software control. Engineering considerations drive the allocation of functions to software, firmware and/or hardware. In particular, both nodes 402, 404 and the base station 200 will generally employ a computer running a software program which perform the ascribed functions, or directs hardware to performs the ascribed tasks in functional modules prepared for such tasks. At least some of the physical communication is performed in hardware, but data manipulations may be performed, for example, by a computer operating under software control, or by microprocessors operating under firmware control, or by application specific integrated circuits (ASICs) or field programmable gate array, a portion of which is used for the specific manipulations.

Figure 1G:
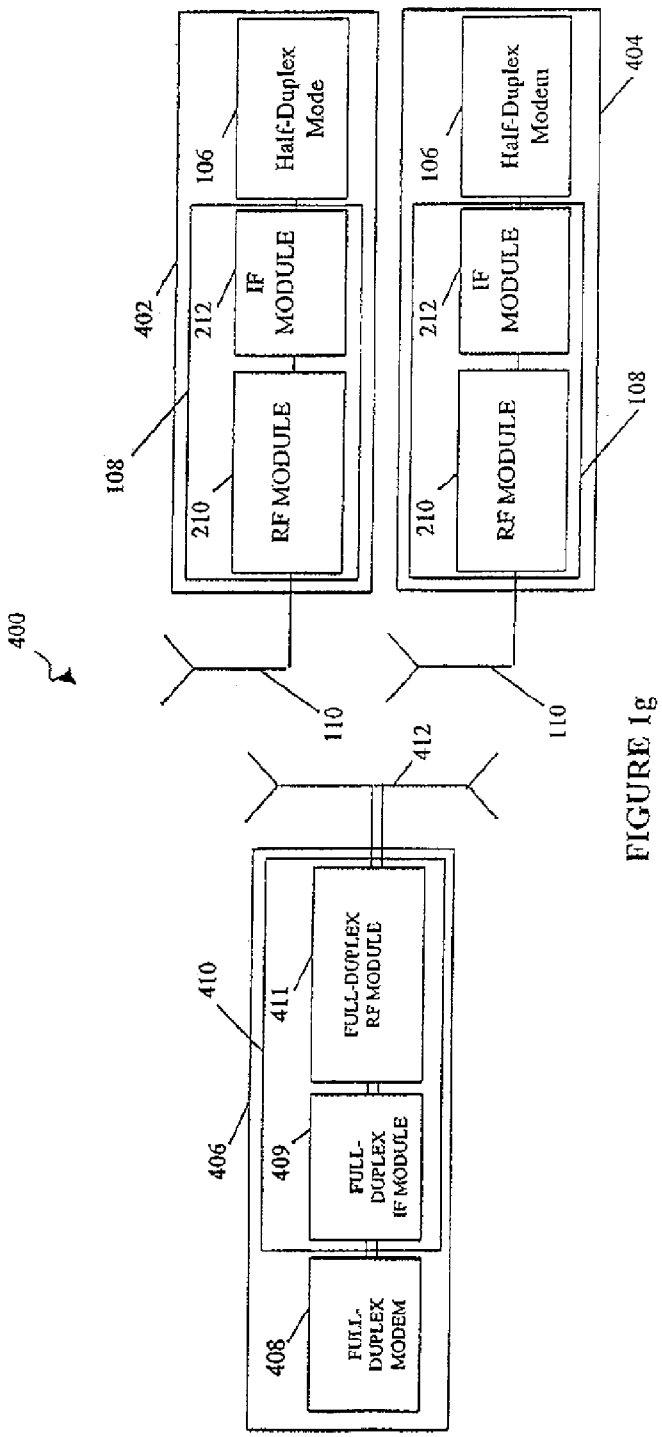
FIG. 1g is a block diagram of a first node and a second node communicating with a full-duplex base station in an FDD communication region.

FIG. 1g is a block diagram of a first node 402 and a second node 404 communicating with a full-duplex base station 406 in an FDD communication region. The system 400 provides wireless connectivity between the base station 406 and the first and second nodes 402, 404.

Each node 402, 404 can include a half-duplex modem 106, a half-duplex outdoor unit ("ODU") 108, and an antenna 110, for example a directional antenna. The modem 106, ODU 108, and antenna 110 are the same as described with reference to FIG. 1e.

The base station 406 shown in FIG. 1g includes a full-duplex modem 408, a full-duplex ODU 410, and a full-duplex antenna 412, for example, a smart antenna. The base station 406 transmits an outgoing signal and receives an incoming signal simultaneously on different channels. The full-duplex modem 408 is configured to modulate and demodulate an incoming signal and to demodulate an outgoing signal simultaneously. The full-duplex ODU down converts the incoming signal from a radio frequency in stages to a base band frequency. The full-duplex ODU also upconverts a modulated base band signal in stages prior to transmission of the outgoing signal at the radio frequency. Alternatively, the up conversion and down conversion can occur in one stage or more than two stages.

The full-duplex ODU 410 can include a full-duplex intermediate frequency ("IF") module 409 and a full-duplex radio frequency ("RF") module 411. The full-duplex IF module 409 is configured to simultaneously upconvert an outgoing signal and down convert an incoming signal on different channels. The full-duplex RF module 411 is configured to simultaneously upconvert the outgoing signal from the IF module and down convert an incoming signal from the antenna 412. The antenna 412 is configured to simultaneously transmit to a first sector and receives from a second sector within a coverage area. For example, the antenna 412 transmits to two independent sectors simultaneously.

Alternatively, the base station can include two half-duplex modems 106 and a hybrid ODU. The hybrid ODU includes two half-duplex IF modules 212 and a full-duplex RF module 411. The full-duplex RF module permits simultaneous reception and transmission of subframes of information by the base station. The RF module is tuned to both transmit and receive on both physical channels, however, the two half-duplex IF modules are tuned to the same channel. This alternative is more fully described with reference to FIG. 9 below.

The nodes 402, 404 are synchronized such that only one node transmits during any given period of time. The nodes 402, 404 utilizes a timing signal, for example a timing signal transmitted by the base station to the nodes 402, 404, to maintain synchronization. Alternatively, the nodes may use a GPS signal. The base station 406 is the only transmitter operating in the downlink direction; hence it transmits without having to synchronize with other base stations. Although, as will be described later with respect to FIG. 10, synchronization with other base stations can be desirable to reduce co-channel interference.

Figure 2:
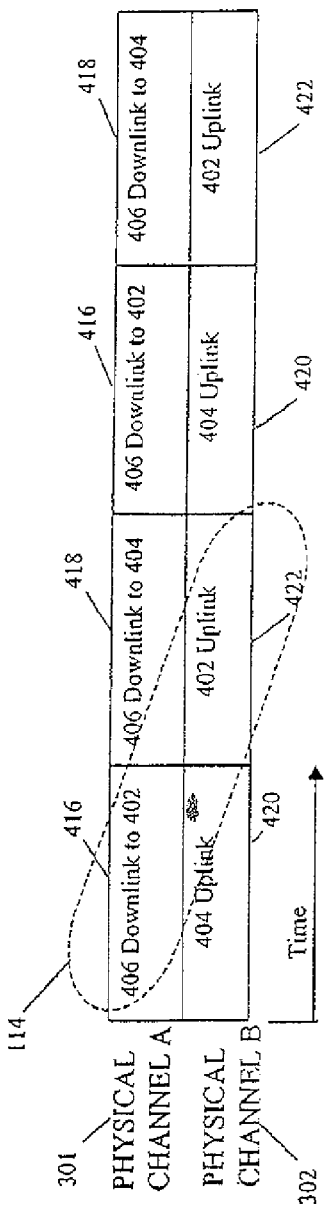
FIG. 2 is a block diagram of a frame structure that includes two physical channels for use with the communication system of FIG. 1g.

FIG. 2 is a block diagram of a frame structure which can be used with the communication system of FIG. 1g. The Figure represents a discrete time segment. For example, physical channel A 301 is allocated for the downlink from the base station 406 to the first and second nodes 402, 404 (See FIG. 1g). The base station 406 alternates its broadcast between a subframe 416 which includes information for node 402 and a subframe 418 which includes information for node 404.

Physical channel B 302 is allocated for subframes 420, 422 in an uplink direction from the first and second nodes 402, 404 to the base station 406. Node 402 and node 404 can alternate in their transmission of subframes 420, 422. Subframe 420 includes information transmitted by node 404 while subframe 422 includes information transmitted by node 402. Thus, the base station 406 receives alternating subframes from the nodes 402, 404 on physical channel 302. Alternatively, the assigning of subframes on physical channel B can be varied depending, for example, on the bandwidth requirements of the nodes.

Physical channel A 301 includes the downlinks from base station 406 to node 404 while physical channel B 302 includes the uplinks from node 404 to base station 406. Thus, subframes 418 and 420 from physical channels A and B, respectively, form a logical channel between node 404 and base station 406. Similarly, physical channel A 301 includes the downlinks from base station 406 to node 402 while physical channel B 302 includes the uplinks from node 402 to base station 406. Thus, subframes 416 and 422 from physical channels A and B, respectively, also form a logical channel between node 402 and base station 406. For example, the uplink and downlink subframes that form the logical channel between node 402 and the base station are illustrated by frame 114.

Referring to FIGS. 1g and 2, each RF module 210 of each node is configured to allow its node to utilize both available physical channels 301, 302. For example, when node 404 transmits information, its RF module 210 selects channel 302 for the information's transmission through its antenna 110. When node 404 is scheduled to receive information from base station 406, its RF module 210 switches from channel 302 to channel 301. Thus, node 404 uses both channels 301, 302.

Figure 3:
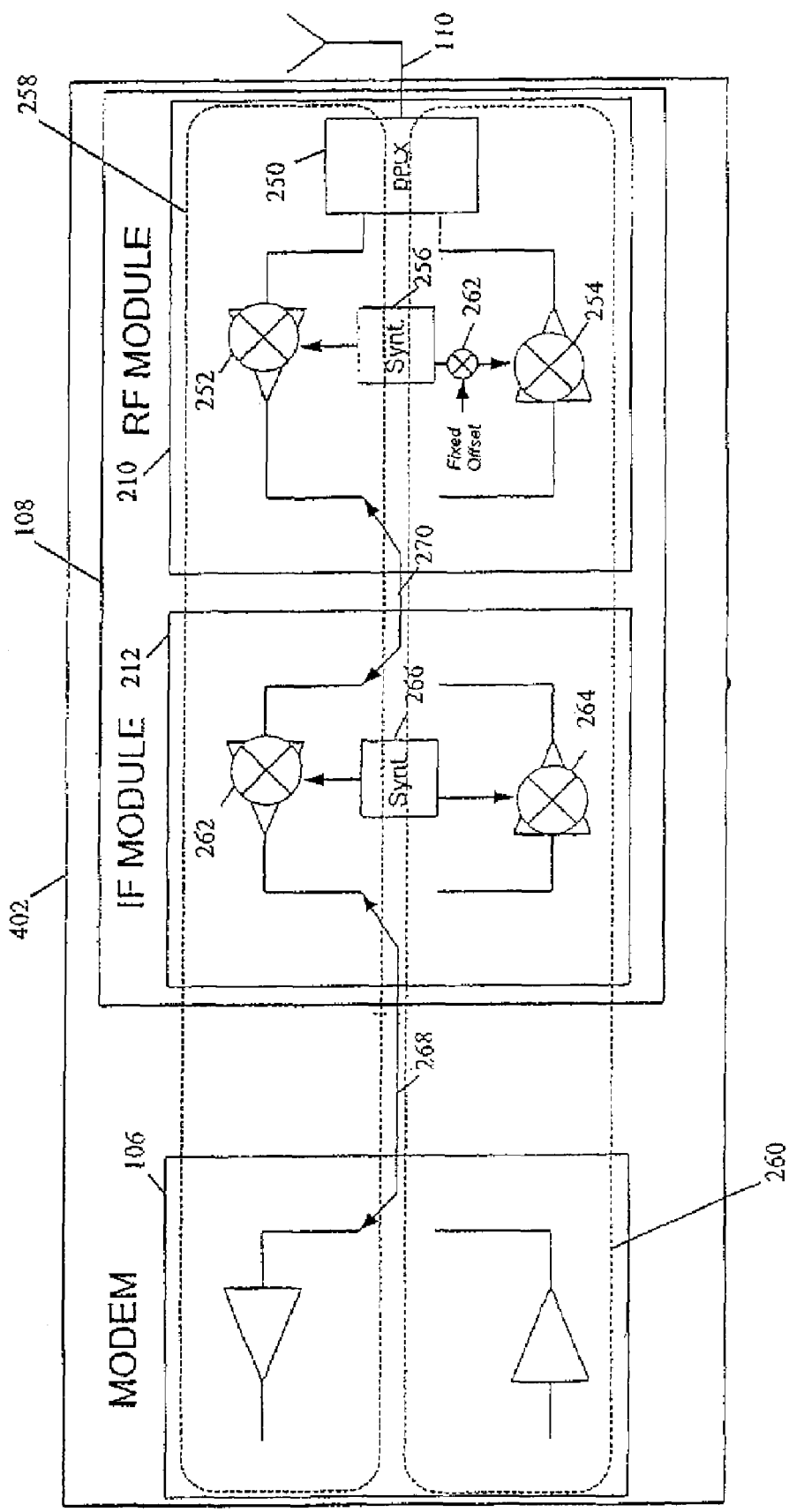
FIG. 3 is a block diagram showing the signal paths through the first and second nodes.

FIG. 3 is a block diagram showing the signal paths through nodes 402 and nodes 404. The described signal path also illustrates the signal path through the base station components 211(*a*), 211(*b*) (See FIG. 1e). For ease of description, the signal path will be described with reference to node 402. Although the following discussion relates to a system that transmits information within the Local Multi-Point Distribution Services (LMDS) band at frequencies of approximately 28 GHz, the system is not so limited. Embodiments of the system are designed to transmit information at frequencies, for example, of 10 GHz to 66 GHz.

As shown in FIG. 3, a signal is received on a radio frequency ("RF") at the antenna 110. The signal is passed into an RF module 210 for down conversion to an intermediate frequency ("IF"). The RF module 210 can include a duplexer 250, an RF down conversion module 252, an up conversion module 254, and a millimeter-wave band frequency synthesizer 256. The duplexer 250 is configured to switch between a receive channel 302, channel B and a transmit channel 301, channel A (See FIG. 2). Alternatively, the duplexer 250 can be configured to simultaneously transmit and receive to eliminate having the duplexer 250 switch between the receive and transmit channels. Data received on channel A follows a receive signal path 258. Conversely, data transmitted by nodes 402, 404 on channel B follows a transmit signal path 260.

Within the RF module 210, the received signal from the antenna 110 is sent to an RF down conversion module 252 for down conversion to an intermediate frequency ("IF"). The RF down conversion module 252 communicates with the millimeter-wave band frequency synthesizer 256 to down convert the received signal to the IF. The millimeter-wave band frequency synthesizer 256 maintains a fixed offset 262 between the band of frequencies assigned to channel 13 and the band of frequencies assigned to channel A. The frequency offset 262 is selected based on the frequency separation between channel A and channel B.

Continuing along the receive signal path 258, the received signal passes to the IF module 212 via switch 270. If the switch 270 is set to receive mode, the received signal is sent to the IF module 212. The IF module 212 includes an IF down conversion module 262, an IF up conversion module 264, and an IF band synthesizer 266. The IF down conversion module 262 uses the IF band synthesizer 266 to further down convert the received signal to a base band signal prior to its transmission to the modem 106 via switch 268. If the switch 268 is set to receive mode, the received signal passes to the modem 106.

Turning to the transmit signal path 260, once data is modulated by the modem 106 into a transmit signal, it is fed to the IF module 212 through the switch 268. If the switch 268 is set to transmit mode, the transmit signal is sent to the IF up conversion module 264. The IF up conversion module 264 up converts the base band signal to an IF through the IF band synthesizer 266. Once the transmit signal has been up-converted to the IF, it continues along the transmit signal path 260 to the RF module 210 through the switch 270. If the switch 270 is set to transmit mode, the transmit signal is sent to the RF up conversion module 254.

The RF up conversion module 254 includes the millimeter-wave band frequency synthesizer 256 for up-converting the transmit signal to the radio frequency of, for example, approximately 28 GHz (LMDS band). As mentioned above, the millimeter-wave band frequency synthesizer 256 applies the frequency offset 262 to the transmit signal. The frequency offset 262 is selected based on the frequency separation between channel A and channel B. Once the transmit signal is offset from the received signal. The signal passes through the duplexer 250 and is transmitted over the air through the antenna 110 to the base station 406.

FIG. 4 is a block diagram of nodes 502(a), 502(b) in a first sector and nodes 504(a), 504(b) in a second sector communicating with a base station 200 in an FDD communication region. The first and second sectors are located within the coverage area of the base station 200. Additional nodes can be included depending on system requirements. Only four nodes are shown for ease of description. Each node includes a modem 106, an ODU 108, and an antenna 110 all as described with reference to FIG. 1e. The base station 200 can include base station components 211(a), 211(b) along with their respective antennas 110, all as described with reference to FIG. 1e.

FIG. 5 is a block diagram of a frame structure that includes two physical channels for use with the communication system of FIG. 4. Referring now to FIGS. 4 and 5, the base station 200 transmits to nodes 504(a), 504(b) in a subframe and to nodes 502(a), 502 (b) in a different subframe all on the downlink physical channel A 301. For example, during subframe 510 the base station components 211(b) transmit information intended for nodes 502(a), 502 (b). During subframe 512 the base station 200 transmits information intended for nodes 504(a), 504(b). Each group of nodes 502, 504 alternates in its transmission of frames to the base station on an uplink physical channel B 302. For example, during a subframe 514 nodes 504(a)-(b) transmit information that is intended for the base station components 211(a). Following subframe 514 is a subframe 516 during which nodes 502(a)-(b) transmit information to the base station components 211(b). However, both the length of the subframe of the channels can be varied or fixed and similarly, the patterns of transmission and reception can be varied.

FIG. 6 illustrates an example of a downlink subframe 600, for example, subframe 510 for use by the base station 200 in transmitting information to nodes 504(a), 504(b) on the downlink physical channel A of FIG. 5. The downlink subframe 600 also represents the subframe 512 which is used by the base station 200 to transmit information to nodes 502(a), 502(b) on the downlink channel A of FIG. 5. For ease of description, the downlink subframe 510 used by the base station components 211(b) will only be described. The frame 600 is subdivided into a plurality of physical layer slots (PS) 602. The subframe 600 can be, for example, one-half millisecond in duration and include 400 physical slots. Alternatively, subframes having longer or shorter duration and with more or fewer PSs can be used.

Each downlink subframe 600 can include a frame control header 604 and downlink data 606. The frame control header 604 includes information for synchronizing with the nodes 502. The base station 406 maintains a downlink subframe map that reflects the downlink PS 602 allocation. The frame control header 604 can include a map of one or more subsequent uplink subframes that are to be transmitted by the pluralities of nodes. For example, referring to FIG. 5 frame 510 can include the map for the subsequent uplink subframe 516. Turning back to FIG. 6, the frame control header 604 can further include a map of attributes of the downlink data 606. For example, attributes may include, but are not limited to, the locations of the PSs in the frame that are intended for each individual node.

The downlink data 606 is transmitted in a pre-defined modulation or a sequence of modulation techniques Mod-A, Mod-B, Mod-C. For example, a sequence such as: QAM-4, followed by QAM-16, followed by QAM-64 could be used. Each node can monitor the information in the subframe 510 and retains only those messages intended for it. Attributes in the frame control header 604 provide this information to the nodes.

Figure 7:
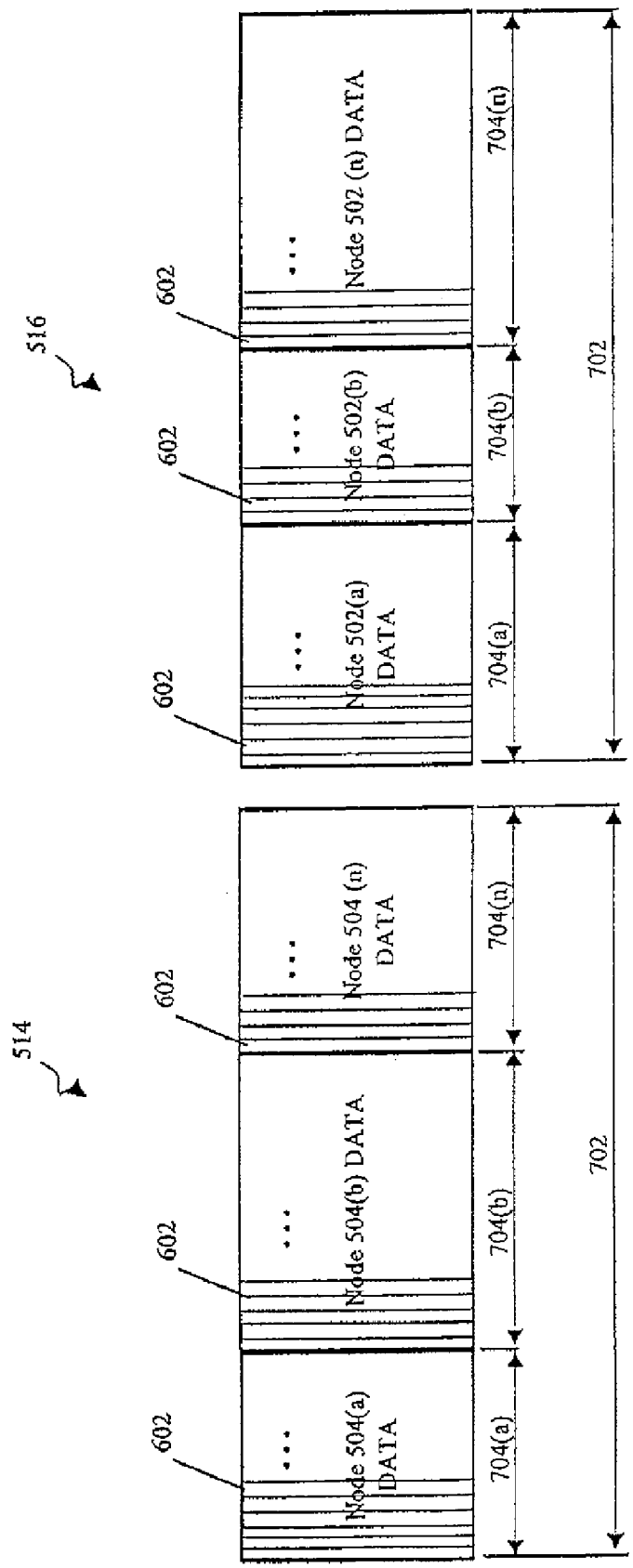
FIG. 7 illustrates an example of two uplink subframes for use by the nodes in the first sector and the nodes in the second sector in transmitting information to the base station.

FIG. 7 illustrates an example of two uplink subframes 514, 516. During subframe 514 nodes 504 (see FIG. 5) transmit information to the base station. In this example, during subframe 516 nodes 502 (see FIG. 5) transmit information to the base station. Each uplink subframe 514, 516 comprises uplink data 702. The subframes 514, 516 are subdivided into a plurality of physical layer slots (PS) 602.

Each node transmits its information during its allocated PS 602 or range of PSs 602. The PSs 602 allocated for each node are grouped into a contiguous block of a group of data blocks 704(a)-(n). When uplink subframe 514 is transmitted, nodes 504(a)-(n) use data blocks 704(a)-(n). Similarly, when uplink subframe 516 is transmitted, nodes 502(a)-(n) use data blocks 704(a)-(n). The range of PSs 602 allocated to each data block 704(a)-(n) is determined by the base station.

The data transmitted in each data block 704(a)-(n) is modulated by the transmitting node. During its data block, the node transmits with a fixed modulation that can be selected based on the effects of environmental factors on the transmission between that node and the base station. Alternatively, a sequence of modulation techniques can be used in each data block 704(*a*)-(*n*) or the data blocks 704(*a*)-(*n*) can be grouped by modulation type.

Figure 8:
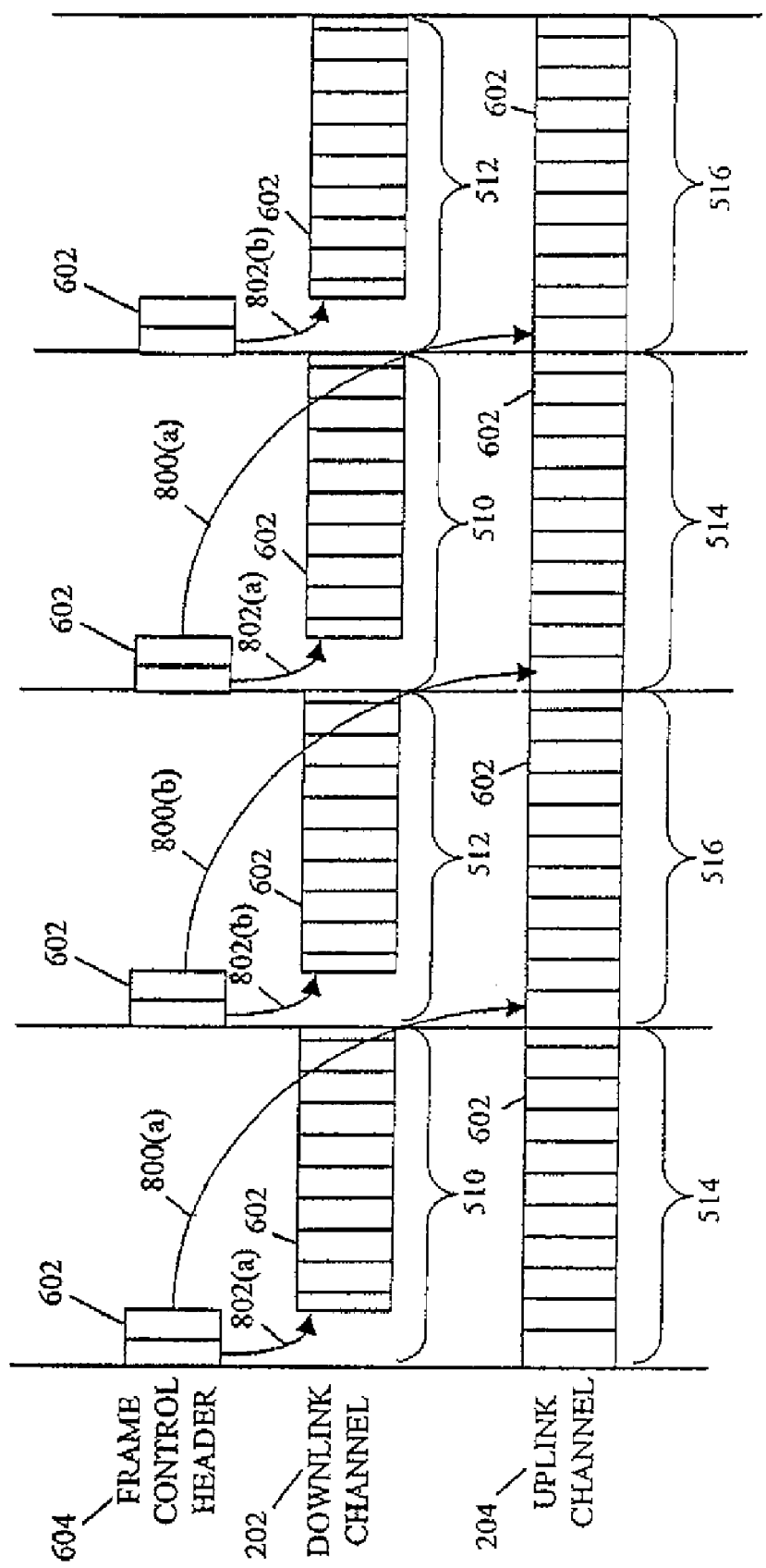
FIG. 8 illustrates a sequence for transmitting an uplink subframe map along with attributes of the downlink subframe, both within the downlink subframe.

FIG. 8 illustrates an example of a transmission sequence of an uplink subframe map in the downlink subframe 510, 512 (see FIG. 5). As shown by arrow 800(*a*), the frame control header 604, which is part of frame 510, includes a map of the PSs 602 in the subsequent uplink subframe 516. Similarly, the frame control header 604, which is part of downlink subframe 512, includes a map of the PSs 602 in the subsequent uplink subframe 514 as shown by arrow 800(*b*). The attributes of the downlink subframe 510 can be included in its frame control header 604 as illustrated by arrow 802(*a*). Similarly, the attributes of the downlink frame 512 can be included in its frame control header 604 as illustrated by arrow 802(*b*).

Figure 9:
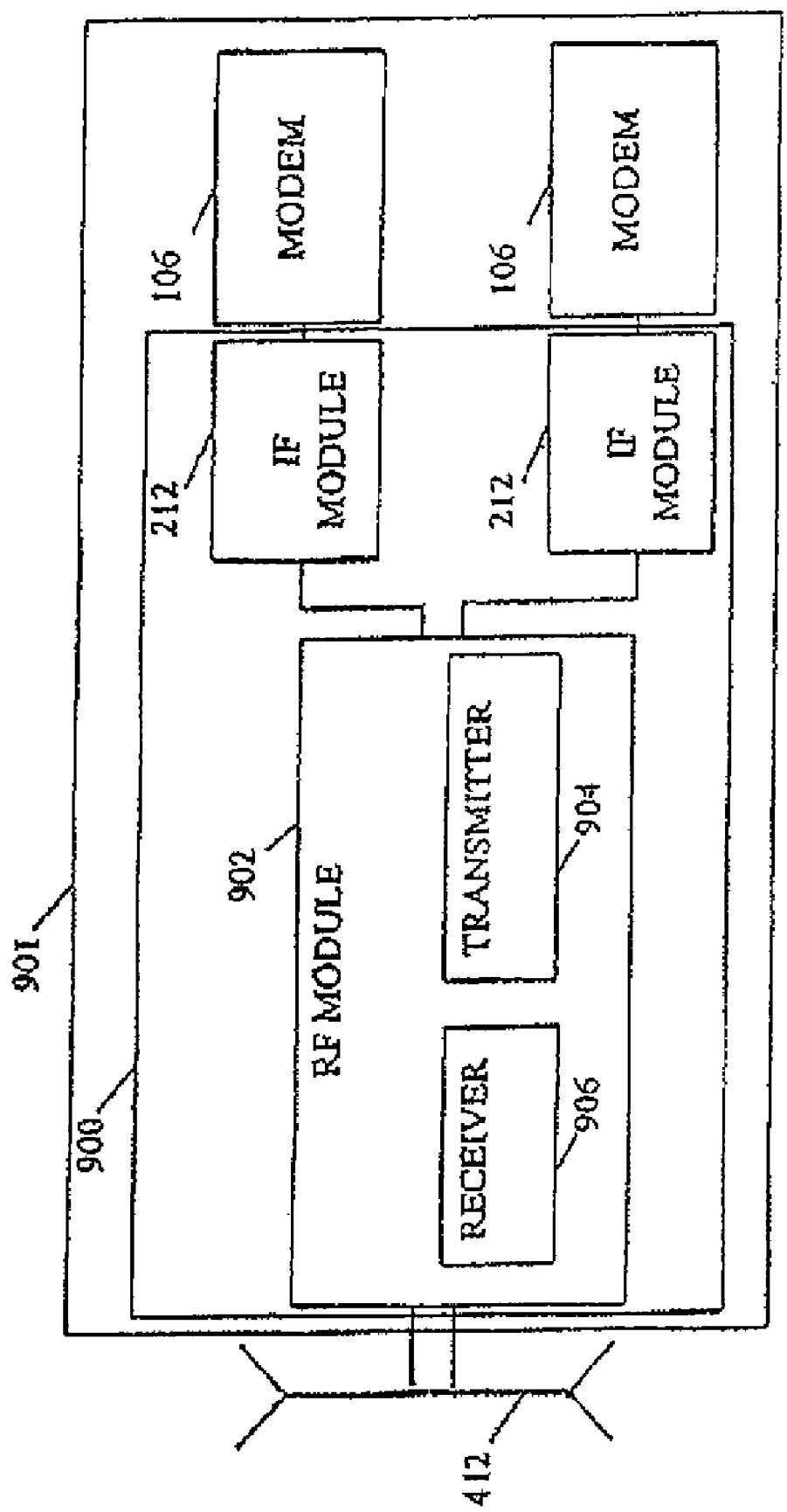
FIG. 9 is a block diagram of a base station that includes a full-duplex RF module and two half-duplex IF modules.

FIG. 9 is a block diagram of a base station 901 which includes a hybrid ODU 900 and two half-duplex modems 106. The hybrid ODU 900 includes a full-duplex RF module 902 and two half-duplex IF modules 212. The RF module 902 is shared by both modems 106. The full-duplex RF module 902 includes a transmitter module 904 and a receiver module 906 configured to transmit and receive outgoing and incoming signals, respectively. For example, when one of the two modems 106 is transmitting, that modem utilizes the transmitter module 904. The RF module 902 is configured such that the transmitter module 904 transmits during a time frame on a first channel while the receiver module 906 simultaneously receives on a second channel. Thus, during the same time frame the receiver module is available for receiving an incoming signal destined for the second of the two modems. The two modems are synchronized so as to alternate in their shared use of the RF module 902.

Figure 10:
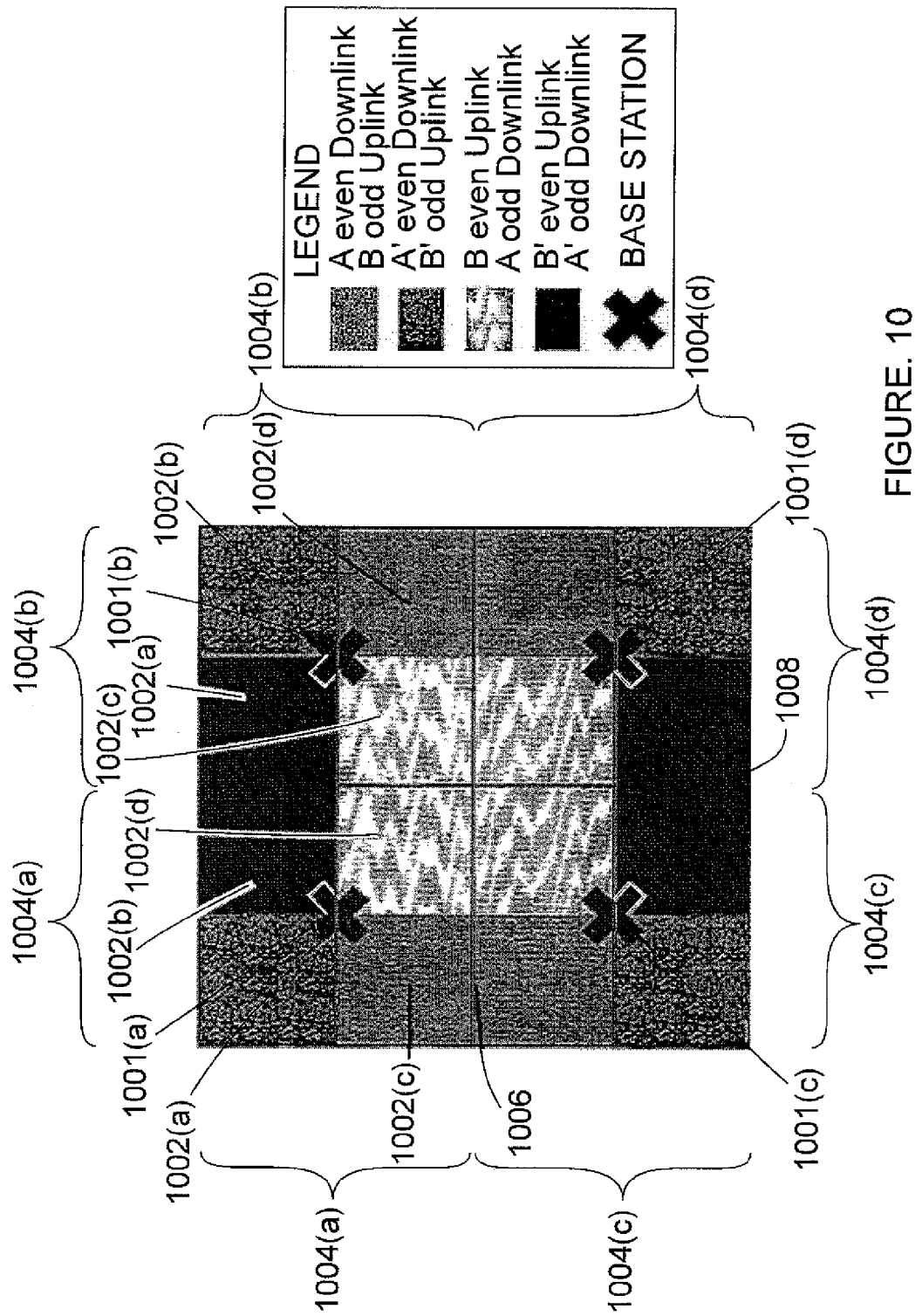
FIG. 10 is a diagram showing uplink channels A and B being used four times in a cell by half-duplex nodes.

FIG. 10 is a diagram showing uplink channels A and B being used four times in a cell by half-duplex nodes. Each base station 1001(*a*)-(*d*) includes four sets of base station components 211(*a*)-(*d*) and four antenna 110 (See FIG. 5). Each of the four sets of base station components is configured to communicate with the half-duplex nodes in a different sector. Each base station 1001(*a*)-(*d*) communicates with a group of nodes in the base station's coverage area, or cell. Clusters of four sectors 1002(*a*)-(*d*) surround each base station 1001(*a*)-(*d*). Each cluster of four sectors forms a cell 1004(*a*)-(*d*). The cells are shown as separated by bold lines 1006, 1008. Each cell 1002(*a*)-(*d*) comprises four or six sectors. In the case of a four sector cell, the coverage area covered by the sector is square (as shown in FIG. 10). In the case of six sectors, the coverage area covered by the cell is hexagonal.

Each cell 1004 has an associated and corresponding base station components 211(*a*)-(*d*). For example, cell 1004(*a*) has a corresponding base station 1001(*a*). Each set of base station components 211(*a*)-(*d*) has an antenna 110 for communicating with the nodes within its associated sector 1002(*a*)-(*d*). Thus, the base station 1001 includes four sectored antenna, one for communicating with each sector 1002(*a*)-(*d*). Each sector contains a group of nodes that communicate with the base station 1001 on a unique logical channel at any given time.

In accordance with frequency re-use methodologies and techniques, a set of two physical channels is allocated for use in each cell 1004(*a*)-(*d*). Physical channel A is allocated for downlink transmissions throughout the cell. Physical channel B is allocated for uplink transmissions throughout the cell. As shown in FIG. 10, for example, each cell 1004 utilizes a set of four orthogonal physical channels (A, A', B, B') comprising the two physical channels (A and B) for uplink and downlink communications between the nodes and the base station. Physical channels A and B each have two different polarizations (designated by the prime and non-prime indicators). As explained with reference to FIGS. 1*e* and 1*f*, each pair of physical channels forms two logical channels. Since four orthogonal channels are available for use in FIG. 10, four logical channels are formed. Each logical channel includes alternating subframes from two of the four available physical channels (A, A', B, B'). Since physical channels A and A' are used for downlinks within each cell, each logical channel will include either A or A'. Since physical channels B and B' are used for uplinks within each cell, each logical channel will include either B or B'. Each sector 1002(*a*)-(*d*) of a cell 1004(*a*)-(*d*) therefore utilizes a different logical channel for communication between the nodes in the sector 1002 and the associated base station 1001. In each cell 1004(*a*)-(*d*), the pattern of frequency distribution is a mirror image of the adjacent and diagonal cells 1004(*a*)-(*d*). Thus, for example, sector 1002(*a*) of cell 1004(*a*) uses the same logical channel as sector 1002(*b*) of cell 1004(*b*).

The nodes within two adjacent sectors, for example, sectors 1002(*a*), 1002(*b*), are synchronized such that only nodes in one of the two sectors transmits during any given period of time. As shown in FIG. 10, sector 1002(*a*) receives its downlink from the base station on physical channel A' while sector 1002(*b*) transmits its uplink to the base station on physical channel B'. Since both of these occur during parallel timeframes of channels A' and B', they are both illustrated as even in FIG. 10. During the same period of time, nodes within sector 1002(*c*) are uplinking to the base station on physical channel B. During the same time period, nodes within sector 1002(*d*) are downlinking to the base station on physical channel A. The nodes can utilizes a timing signal, for example a timing signal may be transmitted by the base station to the nodes, to maintain synchronization. Alternatively, the nodes may use a GPS signal.

Still referring to FIG. 10, each node in the sectors utilizes an antenna 110 (see FIG. 4) for communicating with its associated base station 1001(*a*)-(*d*). Each node operates as described with reference to FIG. 1*g* to utilize 50% of the channel capacity. The antenna 110 is pointed towards the associated base station 1001(*a*)-(*d*). However, without any system wide synchronization between base stations, each base station receives energy from any node operating on the same RF channel and is positioned on a line of site (LoS) relative to the sectored antenna of the base station. The use of system wide synchronization to minimize co-channel interference will be discussed with respect to FIGS. 11 and 12.

Figure 11:
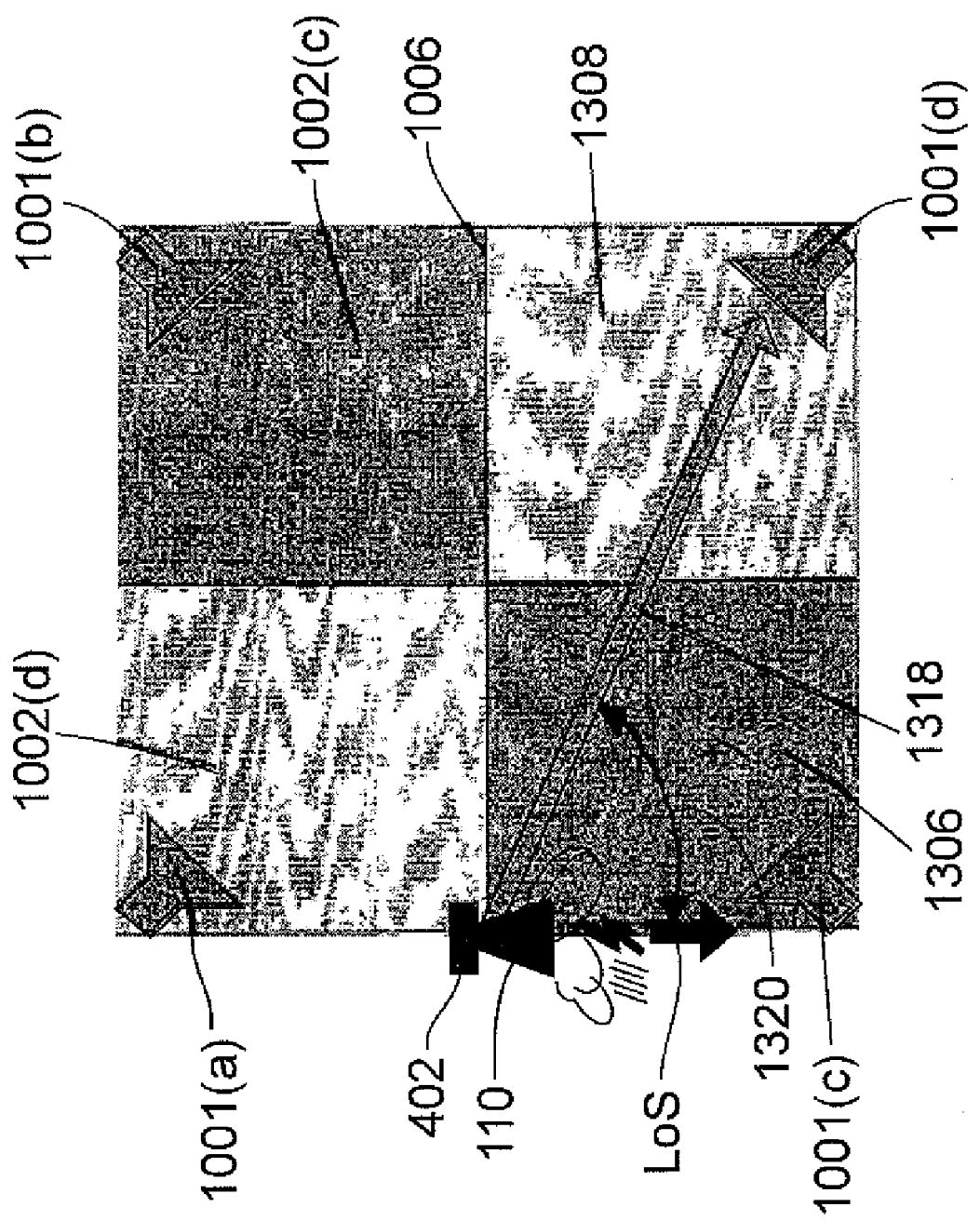
FIG. 11 illustrates four adjacent sectors from four different cells where co-channel interference occurs due to uncorrelated rain fades.

FIG. 11 illustrates four adjacent sectors from four different cells where co-channel interference occurs due to uncorrelated rain fades. An example of such a configuration is shown at the center of FIG. 10. Returning to FIG. 11, base stations 1001(*a*)-(*d*) are located in sectors 1002(*d*), 1002(*c*), 1306, 1308, respectively. Each of the four sectors lie within a different cell wherein frequency re-use is employed (i.e. two channels are used four times within a cell). The four sectors use physical channel A for downlinks to their associated base stations and physical channel B for uplinks to their associated base stations.

Node 402 and its antenna 110 (see FIG. 1*g*) are located near bold line 1006 and transmit along the line of sight ("LoS") towards base station 1001(*c*). While the antenna 110 transmits information along the LoS towards base station 1001(*d*), unwanted noise is also transmitted along a side lobe path 1318 at an angle 1320. As the angle 1320 is increased away from the LoS, the strength of the unwanted noise transmitted by the antenna 110 decreases. For example, when the angle reaches 63 degrees the signal strength along lobe path 1318 is at least 30 dB less than the signal strength along the LoS.

Under typical environmental conditions, i.e. wind, snow, and smog, the node 402 transmits along the LoS at a nominal power level. Under these conditions, the 30 dB decrease minimizes the potential for co-channel interference occurring with base station 1001(*d*). However, under adverse environmental conditions, i.e. rain, the node 402 increases its transmitting power level to counteract signal fade so that its signal reaches base station 1001(*c*). If the side lobe path 1318 is also experiencing adverse environmental conditions, this increase in transmission power level does not substantially increase the potential for co-channel interference with base station 1001(*d*). However, if the side lobe path 1318 is not experiencing similar adverse conditions, the node's increase in transmission power towards base station 1001(*c*) will increase the potential for co-channel interference with base station 1001(*d*).

Figure 12:
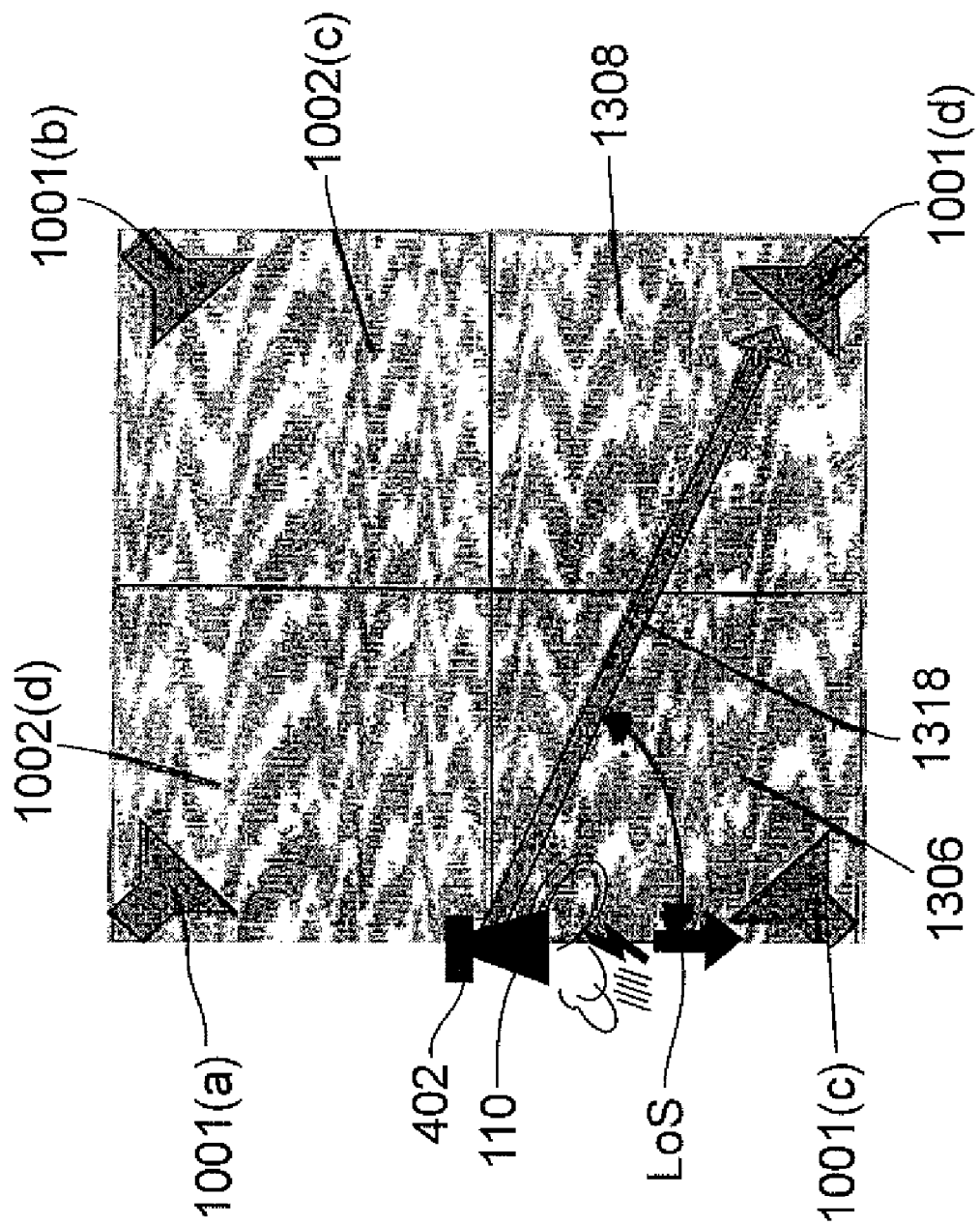
FIG. 12 shows the sectors from FIG. 11 configured to use system-wide synchronization to reduce the co-channel interference caused by uncorrelated rain fades.

FIG. 12 shows the four sectors from FIG. 11 configured to use different time offsets of physical channels A and B to reduce co-channel interference caused by the adverse weather scenario of FIG. 11. In FIG. 12, base stations 1001(*c*), 1001(*d*) receive and transmit information with their associated nodes during different time offsets or subframes. Similarly, adjacent base stations 1001(*a*), 1001(1*b*) receive information from their associated nodes during different time offsets or subframes. For example, when an uplink on channel B along a side load path 1318 reaches base station 1001(*d*), the base station 1001(*d*) is in a transmission mode, not a receiving mode. For example, base station 1001(*d*) is transmitting a downlink to nodes in sector 1308 on chapel A. By using different time offsets for sectors 1002(*c*), 1308 as compared to sectors 1002(*c*), 1306, the potential for co-channel interference between adjacent sectors is reduced under adverse weather conditions.

Aspects of the present invention have been disclosed in one or more exemplary embodiments. These embodiments are not to be construed as limiting, but rather as showing a way to practice the invention. The scope of the invention is defined by the claims which follow.

The invention claimed is:

1. A method comprising:
co-locating a first half-duplex modem, a second half-duplex modem, a third half-duplex modem, and a fourth half duplex modem at a base station, wherein:
the first half-duplex modem is configured to transmit modulated data to a first half-duplex node located in a first sector during a first time frame on a first channel and to receive modulated data from the first half-duplex node during a second time frame on a second channel;
the second half-duplex modem is configured to receive modulated data from a second half-duplex node located in a second sector during the first time frame on the second channel and to transmit modulated data to the second half-duplex node during the first time frame on the first channel;
the third half-duplex modem is configured to transmit modulated data to a third half-duplex node located in a third sector during the first time frame on a third channel and receive modulated data from the third half-duplex node during the second time frame on a fourth channel;
the fourth half-duplex modem is configured to receive modulated data from a fourth half-duplex node located in a fourth sector during the first time frame on the fourth channel and transmit modulated data to the fourth half-duplex node during the second time frame on the third channel;

the modems are configured to transmit and receive in the first time frame substantially simultaneously, and to transmit and receive in the second time frame substantially simultaneously; and
the first time frame precedes the second time frame; and
forming a first cell coverage area for the base station with the first sector, the second sector, the third sector, and the fourth sector.

2. The method of claim 1, wherein the first sector is located adjacent to the second and fourth sectors and the second sector is located adjacent to the first and third sectors, all within the first cell coverage area.

3. The method of claim 2, further comprising deploying a second base station having an associated second cell coverage area formed for the second base station, wherein the second cell coverage area is located adjacent to the first cell coverage area and utilizes the first channel, the second channel, the third channel, and the fourth channel to communicate with nodes in a mirror image of the first cell coverage area.

4. The method of claim 3, wherein the second cell coverage area is formed by rotating the first cell coverage area along an axis of the first cell coverage area that separates the first and second sectors from the third and fourth sectors, such that the resultant second cell coverage area is positioned such that the first sector of the first cell coverage area is adjacent to a first sector of the second cell coverage area and the second sector of the first cell coverage area is adjacent to the second sector of the second cell coverage area.

5. The method of claim 4, further comprising deploying a third base station along having an associated third cell coverage area formed for the third base station, wherein the third cell coverage area is located adjacent to the second cell coverage area and utilizes the first channel, the second channel, the third channel, and the fourth channel to communicate with nodes in a mirror image of the second cell coverage area.

6. The method of claim 5, wherein the third cell coverage area is formed by rotating the second cell coverage area along an axis of the second cell coverage area that separates the first and fourth sectors from the second and third sectors, such that the resultant third cell coverage area is positioned such that the first sector of the second cell coverage area is adjacent to a first sector of the third cell coverage area and the fourth sector of the second cell coverage area is adjacent to the fourth sector of the third cell coverage area.

7. The method of claim 6, further comprising deploying a fourth base station along having an associated fourth cell coverage area formed for the fourth base station, wherein the fourth cell coverage area is located adjacent to the third cell coverage area and utilizes the first channel, the second channel, the third channel, and the fourth channel to communicate with nodes in a mirror image of the third cell coverage area.

8. The method of claim 7, wherein the fourth cell coverage area is formed by rotating the third cell coverage area along an axis of the third cell coverage area that separates the first and second sectors from the third and fourth sectors, such that the resultant fourth cell coverage area is positioned such that the first sector of the third cell coverage area is adjacent to a first sector of the fourth cell coverage area and the second sector of the third cell coverage area is adjacent to the second sector of the fourth cell coverage area.

9. The method of claim 1 wherein, wherein the first channel and the third channel span a frequency band but have different polarizations.

10. The method of claim 9 wherein the second channel and the fourth channel span another similar frequency band but have different polarizations.

11. A method comprising:
co-locating a first full-duplex modem and a second full-duplex modem at a base station, wherein:
the first full-duplex modem is configured to transmit modulated data to a first half-duplex node located in a first sector during a first time frame on a first channel, receive modulated data from the second half-duplex node located in a second sector during the first time frame on a second channel, transmit modulated data to the second half-duplex node during a second time frame on the first channel, and receive modulated data from the first half-duplex node during the second time frame on the second channel;
the second full-duplex modem is configured to transmit modulated data to a third half-duplex node located in a third sector during the first time frame on a third channel, receive modulated data from a fourth half-duplex node located in a fourth sector during the first time frame on a fourth channel, transmit modulated data to the fourth half-duplex node during the second time frame on the third channel, and receive modulated data from the third half-duplex node during the second time frame on the fourth channel;
the modems are configured to transmit and receive in the first time frame substantially simultaneously and to transmit and receive in the second time frame substantiality simultaneously; and
the first time frame precedes the second time frame; and
forming a first cell coverage area for the base station with the first sector, the second sector, the third sector, and the fourth sector.

12. The method of claim 11, wherein the first sector is located adjacent to the second and fourth sectors and the second sector is located adjacent to the first and third sectors, all within the first cell coverage area.

13. The method of claim 12, further comprising deploying a second base station along having an associated second cell coverage area formed for the second base station, wherein the second cell coverage area is located adjacent to the first cell coverage area and utilizes the first channel, the second channel, the third channel, and the fourth channel to communicate with nodes in a mirror image of the first cell coverage area.

14. The method of claim 13, wherein the second cell coverage area is formed by rotating the first cell coverage area along an axis of the first cell coverage area that separates the first and second sectors from the third and fourth sectors, such that the resultant second cell coverage area is positioned such that the first sector of the first cell coverage area is adjacent to a first sector of the second cell coverage area and the second sector of the first cell coverage area is adjacent to the second sector of the second cell coverage area.

15. The method of claim 14, further comprising deploying a third base station along having an associated third cell coverage area formed for the third base station, wherein the third cell coverage area is located adjacent to the second cell coverage area and utilizes the first channel, the second channel, the third channel, and the fourth channel to communicate with nodes in a mirror image of the second cell coverage area.

16. The method of claim 15, wherein the third cell coverage area is formed by rotating the second cell coverage area along an axis of the second cell coverage area that separates the first and fourth sectors from the second and third sectors, such that the resultant third cell coverage area is positioned such that the first sector of the second cell coverage area is adjacent to a first sector of the third cell coverage area and the fourth sector of the second cell coverage area is adjacent to the fourth sector of the third cell coverage area.

17. The method of claim 16, further comprising deploying a fourth base station having and associated fourth cell coverage area formed for the fourth base station, wherein the fourth cell coverage area is located adjacent to the third cell coverage area and utilizes the first channel, the second channel, the third channel, and the fourth channel to communicate with nodes in a mirror image of the third cell coverage area.

18. The method of claim 17, wherein the fourth cell coverage area is formed by rotating the third cell coverage area along an axis of the third cell coverage area that separates the first and second sectors from the third and fourth sectors, such that the resultant fourth cell coverage area is positioned such that the first sector of the third cell coverage area is adjacent to a first sector of the fourth cell coverage area and the second sector of the third cell coverage area is adjacent to the second sector of the fourth cell coverage area.

19. A base station comprising:
an antenna; and
communication components coupled to the antenna and configured to cause the antenna to:
transmit modulated data to a first half-duplex node during a first time frame on a first channel and to receive modulated data from the first half-duplex node during a second time frame on a second channel;
receive modulated data from a second half-duplex node during the first time frame on a second channel and to transmit modulated data to the second half-duplex node during the first time frame on the first channel;
transmit modulated data to a third half-duplex node during the first time frame on a third channel and receive modulated data from the third half-duplex node during the second time frame on a fourth channel; and
receive modulated data from a fourth half-duplex node during the first time frame on the fourth channel and transmit modulated data to the fourth half-duplex node during the second time frame on the third channel;
wherein the communication components are configured to transmit and receive in the first time frame substantially simultaneously, and to transmit and receive in the second time frame substantially simultaneously; and
wherein:
the first time frame precedes the second time frame; and
the first half-duplex node to be located in a first sector, the second half-duplex node to be located in a second sector, the third half-duplex node to be located in a third sector, the fourth half-duplex node to be located in a fourth sector, wherein the first sector, the second sector, the third sector, and the fourth sector to form first a cell coverage area of the base station.

20. The base station of claim 19, wherein the first sector is located adjacent to the second and fourth sectors and the second sector is located adjacent to the first and third sectors, all within the first cell coverage area.

21. The base station of claim 20, wherein a second base station has an associated second cell coverage area formed for the second base station, wherein the second cell coverage area is located adjacent to the first cell coverage area and utilizes the first channel, the second channel, the third channel, and the fourth channel to communicate with nodes in a mirror image of the first cell coverage area.

22. The base station of claim 21, wherein the second cell coverage area is formed by rotating the first cell coverage area along an axis of the first cell coverage area that separates the first and second sectors from the third and fourth sectors, such that the resultant second cell coverage area is positioned such that the first sector of the first cell coverage area is adjacent to a first sector of the second cell coverage area and the second sector of the first cell coverage area is adjacent to the second sector of the second cell coverage area.

23. The base station of claim 22, wherein a third base station has an associated third cell coverage area formed for the third base station, wherein the third cell coverage area is located adjacent to the second cell coverage area and utilizes the first channel, the second channel, the third channel, and the fourth channel to communicate with nodes in a mirror image of the second cell coverage area.

24. The base station of claim 23, wherein the third cell coverage area is formed by rotating the second cell coverage area along an axis of the second cell coverage area that separates the first and fourth sectors from the second and third sectors, such that the resultant third cell coverage area is positioned such that the first sector of the second cell coverage area is adjacent to a first sector of the third cell coverage area and the fourth sector of the second cell coverage area is adjacent to the fourth sector of the third cell coverage area.

25. The base station of claim 24, wherein a fourth base station has an associated fourth cell coverage area formed for the fourth base station, wherein the fourth cell coverage area is located adjacent to the third cell coverage area and utilizes the first channel, the second channel, the third channel, and the fourth channel to communicate with nodes in a mirror image of the third cell coverage area.

26. The base station of claim 25, wherein the fourth cell coverage area is formed by rotating the third cell coverage area along an axis of the third cell coverage area that separates the first and second sectors from the third and fourth sectors, such that the resultant fourth cell coverage area is positioned such that the first sector of the third cell coverage area is adjacent to a first sector of the fourth cell coverage area and the second sector of the third cell coverage area is adjacent to the second sector of the fourth cell coverage area.

27. The base station of claim 19 wherein the communication components include:
   a first half-duplex modem configured to transmit modulated data to the first half-duplex node during the first time frame on the first channel and to receive modulated data from the first half-duplex node during the second time frame on the second channel; and
   a second half-duplex modem configured to receive modulated data from the second half-duplex node during the first time frame on the second channel and to transmit modulated data to the second half-duplex node during the first time frame on the first channel.

28. The base station of claim 27 wherein the communication components further include:
   a third half-duplex modem configured to transmit modulated data to the third half-duplex node during the first time frame on the third channel and to receive modulated data from the third half-duplex node during the second time frame on the fourth channel; and
   a fourth half-duplex modem configured to receive modulated data from the fourth half-duplex node during the first time frame on the fourth channel and to transmit modulated data to the fourth half-duplex node during the first time frame on the third channel.

29. The base station of claim 19 wherein the communication components include a full-duplex modem.

* * * * *

UNITED STATES PATENT AND TRADEMARK OFFICE
CERTIFICATE OF CORRECTION

PATENT NO. : 7,656,825 B2 Page 1 of 1
APPLICATION NO. : 11/969178
DATED : February 2, 2010
INVENTOR(S) : Kenneth L. Stanwood et al.

It is certified that error appears in the above-identified patent and that said Letters Patent is hereby corrected as shown below:

Column 18
Line 51, "...first a cell coverage area..." should read --first cell coverage area...--.

Signed and Sealed this

Twentieth Day of April, 2010

David J. Kappos
*Director of the United States Patent and Trademark Office*